United States Patent
Leon et al.

(10) Patent No.: US 7,390,844 B2
(45) Date of Patent: Jun. 24, 2008

(54) POLYMER PARTICLE STABILIZED BY DISPERSANT AND METHOD OF PREPARATION

(75) Inventors: Jeffrey W. Leon, Rochester, NY (US); Jeanne E. Kaeding, Rochester, NY (US); Dennis E. Smith, Rochester, NY (US); Trevor J. Wear, Harrow (GB); Alan R. Pitt, Sandridge (GB); Peter J. Ghyzel, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 170 days.

(21) Appl. No.: 11/080,040

(22) Filed: Mar. 15, 2005

(65) Prior Publication Data

US 2005/0159507 A1    Jul. 21, 2005

Related U.S. Application Data

(62) Division of application No. 10/118,725, filed on Apr. 9, 2002, now Pat. No. 6,906,157.

(51) Int. Cl.
| C08J 9/00 | (2006.01) |
| C08F 2/44 | (2006.01) |
| C08F 2/20 | (2006.01) |
| C08F 2/24 | (2006.01) |
| C08F 220/56 | (2006.01) |

(52) U.S. Cl. ............ 523/218; 521/52; 521/55; 521/65; 521/99; 521/142; 521/150; 524/845; 526/89

(58) Field of Classification Search ......... 526/220, 526/201, 89; 523/201, 202, 205, 207, 218; 524/242, 392, 458, 845; 521/52, 55, 65, 521/99, 142, 150
See application file for complete search history.

(56) References Cited

U.S. PATENT DOCUMENTS

| 4,134,815 A * | 1/1979 | Jackson et al. ............. 521/31 |
| 4,425,469 A * | 1/1984 | Emmons et al. ............. 524/750 |
| 6,127,453 A | 10/2000 | Erdtmann et al. |
| 6,234,624 B1 | 5/2001 | Erdtmann et al. |
| 6,391,537 B2 | 5/2002 | Lelental et al. |
| 6,468,727 B2 | 10/2002 | Pitt et al. |
| 6,472,139 B1 | 10/2002 | Pitt et al. |
| 6,866,902 B2 | 3/2005 | Kaeding et al. |
| 2001/0034385 A1* | 10/2001 | Pitt et al. ............... 524/98 |
| 2003/0197773 A1 | 10/2003 | Kaeding et al. |

FOREIGN PATENT DOCUMENTS

| JP | 2000-203154 | 7/2000 |
| WO | 01/36501 A1 | 5/2001 |

OTHER PUBLICATIONS

Pavia et al., Makromoleculare Chemie, (1992), 193(9), pp. 2505-2517.
Sudol, E.D. and El-Aasser, M. in Emulsion Polymerization and Emulsion Polymers; Lovell, P.A. and El-Aaser, M. Eds.; John Wiley and Sons Ltd.: New York, 1997; pp. 699-721.
Comun. Jorn. Com. Esp. Deterg. (1995), 26, pp. 323-335.

* cited by examiner

*Primary Examiner*—Kelechi C Egwim
(74) *Attorney, Agent, or Firm*—Lynne M. Blank; Chris P. Konkol

(57) ABSTRACT

The present invention discloses a water dispersible polymer particle stabilized by a hydrophobically capped oligomeric acrylamide dispersant. The present invention also discloses a heterogeneous method for forming polymer particles comprising providing a water immiscible organic phase comprising at least one monomer dispersed in a continuous water phase and a hydrophobically capped oligomeric acrylamide, and polymerizing said organic phase to yield polymer particles stabilized with hydrophobically capped oligomeric acrylamide. Also disclosed in the present invention is a heterogeneous method for forming polymer particles comprising providing a water immiscible organic dispersed in a continuous water phase, polymerizing said organic phase, and adding hydrophobically capped oligomeric acrylamide to yield polymer particles stabilized with hydrophobically capped oligomeric acrylamide.

11 Claims, No Drawings

_US 7,390,844 B2_

POLYMER PARTICLE STABILIZED BY DISPERSANT AND METHOD OF PREPARATION

CROSS REFERENCE TO RELATED APPLICATIONS

This is a Divisional of application Ser. No. 10/118,725 filed Apr. 9, 2002, now U.S. Pat. No. 6,906,157.

Reference is made to commonly assigned, co-pending U.S. patent applications:

Publication Number US 2003-0197773 A1 by Kaeding et al., publication date Oct. 23, 2003 entitled "Ink Printing Method Utilizing Stabilized Polymeric Particles";

Publication Number US 2003-0198761 A1 by Kaeding et al., publication date Oct. 23, 2003 entitled "Ink Recording Element Containing Stabilized Polymeric Particles".

FIELD OF THE INVENTION

This invention relates to water dispersible polymer particles stabilized with a dispersant.

BACKGROUND OF THE INVENTION

Polymer particles encompass an important technology which has found uses in a very wide variety of areas including paints, protective coatings, adhesives, matting agents, absorbent materials, additives for building materials, drug delivery systems, sizing agents, ink additives, bioanalytical systems, cosmetics, and chromatography materials. Polymer particles are usually synthesized in heterogeneous systems consisting of an organic phase and an aqueous phase resulting in an aqueous dispersion of the polymer particles. Colloidal stability is imparted to the particles by a dispersing compound that is usually a surfactant or an oligomeric or polymeric amphiphile. Many of the properties of the polymer particle and its aqueous dispersion are dictated or influenced by the choice of dispersing compound used. These properties include stability of the dispersion to aging, settling, shear, extremes of temperature, and the presence of other materials such as electrolytes, humectants, and flocculants. The choice of dispersing compound wild also influence the size and morphology of the particles as well as the rheology of the dispersion, its propensity toward foaming, and the amount of coagulum formed during the polymerization process.

Nonionic surfactants represent an important class of dispersing compounds. These compounds are desirable in that they afford particles a much higher tolerance toward electrolytes than do ionic dispersants. It is known in the art, however, that the overall colloidal stability of the particles toward other conditions (aging, heating, high shear, etc.) is usually much lower than for particles stabilized with ionic surfactants. Thus, it is commonly practiced in the art of heterogeneous polymerizations, (notably emulsion polymerizations) that nonionic surfactants are used in tandem with an ionic surfactant (usually anionic) in order to gain sufficient colloidal stability. Thus there is a need in the art of heterogeneous polymerization for a nonionic dispersant which yields particle dispersions with colloidal stability which is comparable to those obtained with ionic surfactants.

Miniemulsion (also known as "microsuspension") polymerizations are a specific type of heterogeneous polymerization in which a chain polymerization occurs within a preformed oil-in-water dispersion in which the monomers are contained within the oil phase. It is known that for this type of polymerization (see Sudol, E. D. and El-Aasser, M. in _Emulsion Polymerization and Emulsion Polymers_; Lovell, P. A. and El-Aaser, M. Eds.; John Wiley and Sons Ltd.: New York, 1997; p. 699-721) a "cosurfactant" is needed in order to prevent Ostwald ripening of the particles. This cosurfactant is a hydrophobic compound, such as hexadecane or hexadecanol. This component, though necessary, may be unwanted for certain applications in which its presence might be deleterious. Thus there also exists a need for a surfactant useful for miniemulsion polymerization, which alleviates the need for a cosurfactant.

Hydrophobe-capped polyacrylamide oligomers have been reported as milling agents for pigment particles in inkjet inks, as stabilizers for photographic coupler dispersions, and as stabilizers for organosilver particles. U.S. Pat. No. 6,127,453, US 2001/0031436 A1 and U.S. Ser. No. 09/776,107. These applications, however, each involve the stabilization of species that are not polymer particles (i.e. silver behenate particles, pigmented colorants, and photographic coupler solvents). It is known in the art that different classes of chemical species will have fundamentally different requirements for dispersants and the use of these dispersants in these applications would not suggest their usefulness in stabilizing polymer particles.

In _Comun. Jorn. Com. Esp. Deterg._ (1995), 26, 323-35, the authors report the use of polyacrylamide as a dispersant in an inverse emulsion polymerization. This compound, however, is a different chemical composition than the hydrophobically capped polyacrylamide oligomers reported herein and would be expected to have fundamentally different activity as a stabilizer of polymer particles.

The object of this invention is to provide dispersant-stabilized polymer particles which show improved excellent colloidal stability when dispersed in aqueous media.

SUMMARY OF THE INVENTION

These and other objects are achieved in accordance with this invention which relates to a water dispersible polymer particle stabilized by a hydrophobically capped oligomeric acrylamide dispersant. The present invention also includes a heterogeneous method for forming polymer particles comprising providing a water immiscible organic phase comprising at least one monomer dispersed in a continuous water phase and a hydrophobically capped oligomeric acrylamide, and polymerizing said organic phase to yield polymer particles stabilized with hydrophobically capped oligomeric acrylamide. Also included in the present invention is a heterogeneous method for forming polymer particles comprising providing a water immiscible organic dispersed in a continuous water phase, polymerizing said organic phase, and adding hydrophobically capped oligomeric acrylamide to yield polymer particles stabilized with hydrophobically capped oligomeric acrylamide.

In a preferred embodiment of this invention the hydrophobically capped oligomeric acrylamide dispersant has the formula (I):

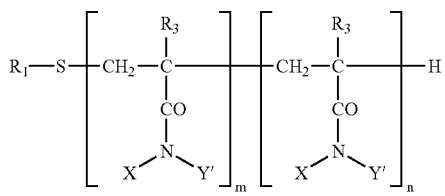

or the formula (II):

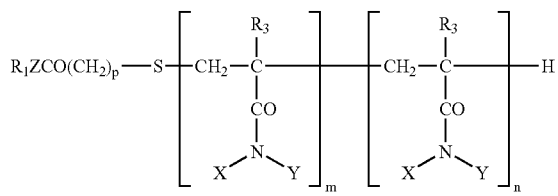

or the formula (III):

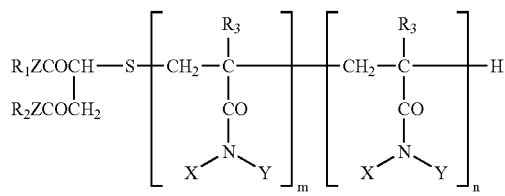

wherein:

each $R_1$ and $R_2$ independently represents a linear or branched alkyl, alkenyl or arylalkyl group having from 1 to about 30 carbon atoms, with the sum of $R_1$ and $R_2$ comprising from about 8 to about 50 carbon atoms, each $R_3$ independently represents hydrogen or a methyl group, each X independently represents hydrogen or an alkyl group containing up to about 4 carbon atoms, each Y independently represents hydrogen or an alkyl group containing up to about 4 carbon atoms or a hydroxylated or sulfonated alkyl group containing up to about 4 carbon atoms, Y' represents an alkyl group containing up to about 4 carbon atoms or a hydroxylated or sulfonated alkyl group containing up to about 4 carbon atoms, each Z independently represents oxygen, NH, $NR_1$ or S, m is an integer of from about 2 to about 80, n is an integer of from 0 to about 80, and p is an integer of from about 1 to about 6.

DETAILED DESCRIPTION OF THE INVENTION

This invention provides several advantages over the prior art. First, polymer particles stabilized by hydrophobically capped oligomeric acrylamides show excellent colloidal stability as compared to similar polymer particles stabilized by other common surfactants. In one embodiment of this invention, wherein the oligomeric acrylamides are nonionic in character, the resultant nonionic particles show colloidal stability of an extent which can usually only be obtained when an ionic surfactant is used in tandem with a nonionic surfactant. These nonionic particles can be subjected to post polymerization chemical modification reactions, such as quaternization with minimal, if any, coagulation. In addition, the production of polymer particles via a miniemulsion polymerization using a hydrophobically capped oligomeric acrylamide dispersant alleviates the need for the use of a cosurfactant and hence will yield polymer particles which are free of this component. The hydrophobically capped oligomeric acrylamides of the present invention are referred to herein as a dispersants, while still maintaining the functionality of surfactants.

Polymer particles are said to be "stabilized" or "colloidally stable" when they will remain dispersed as single entities within an interposing liquid medium for long periods of time. The attractive interactions between the particles are overcome by steric or ionic repulsive forces provided by small molecules, macromolecules, or specific chemical units or functionalities which are chemically bonded or physically adsorbed to the particle's surface. For the purposes of this document, the interposing medium will be water or a mixture of water and a water-miscible solvent. In a practical sense, polymer particles which are insufficiently stabilized will agglomerate or flocculate and form a distinct solid phase which will be evident as macroscopic solids or as settled material. It will be noted that in the art of heterogeneous polymerization, it is not uncommon for a small amount (up to 15% of total solids) of coagulum to form within an otherwise colloidally stable dispersion. Although this coagulum is often removed via filtration, the presence of such a small amount of coagulum within an otherwise colloidally stable dispersion is acceptable.

The water dispersible polymer particle of this invention may be made from a heterogeneous polymerization or by a solvent evaporation or precipitation process performed in the presence of a hydrophobically capped oligomeric acrylamide dispersant. Any hydrophobically capped oligomeric acrylamide dispersant may be used in the invention provided it produces the desired results. In a preferred embodiment of the invention, the hydrophobically capped oligomeric acrylamide dispersant has the formula (I):

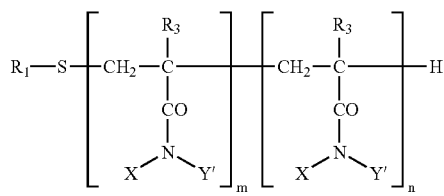

or the formula (II):

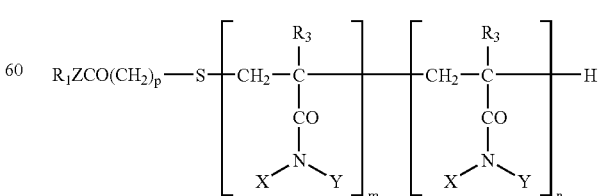

or the formula (III):

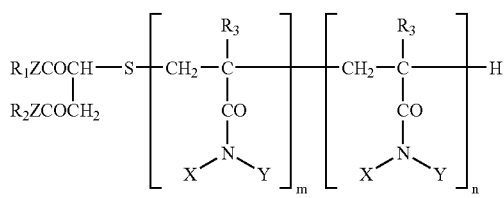

wherein:

each $R_1$ and $R_2$ independently represents a linear or branched alkyl, alkenyl or arylalkyl group having from 1 to about 30 carbon atoms, such as octyl, 2-ethylhexyl, decyl, dodecyl, octadecyl, octadecenyl, 3-phenylpropyl, 3-phenyl-2,2-dimethylpropyl etc., with the sum of $R_1$ and $R_2$ comprising from about 8 to about 50 carbon atoms, each $R_3$ independently represents hydrogen or a methyl group, each X independently represents hydrogen or an alkyl group containing up to about 4 carbon atoms, such as methyl, ethyl or isopropyl etc., each Y independently represents hydrogen or an alkyl group containing up to about 4 carbon atoms, such as methyl, ethyl or isopropyl etc., or a hydroxylated or sulfonated alkyl group containing up to about 4 carbon atoms, such as tris (hydroxymethyl) methyl, diethanolammonium-2,2-dimethyl ethyl sulfonate, or 2,2-dimethylethyl sulfonate, wherein the sulfonated alkyl group may contain an associated alkali metal such as sodium, or ammonium or alkylated ammonium counter ion. Preferably, the total number of carbons comprising X and Y will be 0-3 or X or Y will comprise a sulfonate group.

Y' represents an alkyl group containing up to about 4 carbon atoms or a hydroxylated or sulfonated alkyl group containing up to about 4 carbon atoms, each Z independently represents oxygen, NH, $NR_1$ or S, m is an integer of from about 2 to about 80, n is an integer of from 0 to about 80, and p is an integer of from about 1 to about 6, preferably from about 1 to 2.

More preferably, the dispersants of the present invention may be represented by the two structures, Structure 1 and Structure 2, below wherein z, the number of repeating units, is between 5 and 90 and $R_4$, $R_5$, and $R_6$ are saturated or unsaturated, branched or unbranched hydrocarbon chains containing 4 to 30 carbons atoms and q can be 0 or 1. L is an optional linking group which can be $-O_2CCH_2-$ or $-NH-COCH2-$.

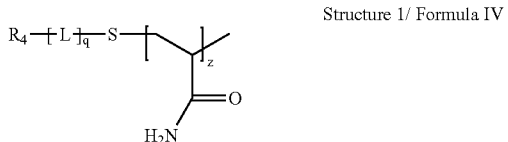

Structure 1/ Formula IV

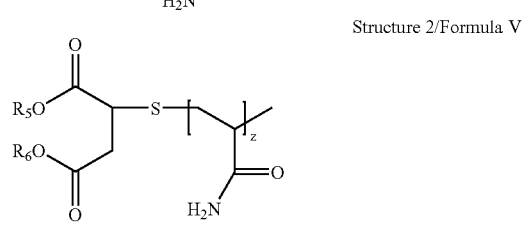

Structure 2/Formula V

Specific examples of the hydrophobically capped oligomeric acrylamide dispersants useful in the invention include the following:

TABLE 1

| Acrylamide Dispersant | Chemical Structure |
|---|---|
| P-1 | $C_{12}H_{25}S-(CH_2-CH)_{10}-H$ <br> \| <br> $CONH_2$ |
| P-2 | $C_{10}H_{21}S-(CH_2-CH)_{15}-H$ <br> \| <br> $CONH_2$ |
| P-3 | $C_{18}H_{37}S-(CH_2-CH)_4-H$ <br> \| <br> CO <br> \| <br> NH <br> \| <br> $CH_3-C-CH_3$ <br> \| <br> $SO_3^-Na^+$ |
| P-4 | $C_4H_9CH(C_2H_5)CH_2O_2C$ <br> $C_4H_9CH(C_2H_5)CH_2O_2C$ $>S-(CH_2-CH)_{10}-H$ <br> \| <br> $CONH_2$ |

TABLE 1-continued

| Acrylamide Dispersant | Chemical Structure |
| --- | --- |
| P-5 | $\text{C}_4\text{H}_9\text{CH}(\text{C}_2\text{H}_5)\text{CH}_2\text{O}_2\text{C}-\underset{\text{C}_4\text{H}_9\text{CH}(\text{C}_2\text{H}_5)\text{CH}_2\text{O}_2\text{C}}{\text{CH}}-\text{S}-[\text{CH}_2-\underset{\text{CON}(\text{CH}_3)_2}{\text{CH}}]_{15}-\text{H}$ |
| P-6 | $\text{C}_{12}\text{H}_{25}\text{S}-[\text{CH}_2-\underset{\underset{\underset{\underset{\text{SO}_3^-\text{Na}^+}{\mid}}{\text{C}(\text{CH}_3)_2}}{\mid}}{\text{CH}}]_2-\text{H}$ with $-\text{CO}-\text{NH}-\text{C}(\text{CH}_3)_2-\text{CH}_2\text{SO}_3^-\text{Na}^+$ |
| P-7 | $\text{C}_{16}\text{H}_{33}\text{S}-[\text{CH}_2-\text{CH}]_{15}-\text{H}$; side chain: $-\text{CO}-\text{NH}-\text{C}(\text{CH}_2\text{OH})_3$ |
| P-8 | $\text{C}_8\text{H}_{17}-\text{CH}=\text{CH}-(\text{CH}_2)_8\text{O}_2\text{CCH}_2\text{S}-[\text{CH}_2-\text{CH}]_4-\text{H}$; side chain: $-\text{CO}-\text{NH}-\text{C}(\text{CH}_3)_2-\text{CH}_2\text{SO}_3^-\text{Na}^+$ |
| P-9 | $\text{C}_{16}\text{H}_{33}\text{S}-[\text{CH}_2-\text{CH}]_4-\text{H}$; side chain: $-\text{CO}-\text{NH}-\text{C}(\text{CH}_3)_2-\text{CH}_2\text{SO}_3^-\text{Na}^+$ |
| P-10 | $\text{C}_8\text{H}_{17}-\text{CH}=\text{CH}-(\text{CH}_2)_8\text{NHCOCH}_2\text{S}-[\text{CH}_2-\text{CH}]_5-\text{H}$; side chain: $-\text{CO}-\text{NH}-\text{C}(\text{CH}_3)_2-\text{CH}_2\text{SO}_3^-\text{Na}^+$ |
| P-11 | $\text{C}_{18}\text{H}_{37}\text{S}-[\text{CH}_2-\text{CH}]_4-\text{H}$; side chain: $-\text{CO}-\text{NH}-\text{C}(\text{CH}_3)_2-\text{CH}_2\text{SO}_3^-\text{HN}(\text{CH}_2\text{CH}_2\text{OH})_2^+$ |

The hydrophobically capped oligomeric acrylamide dispersants useful in the invention may be prepared by methods similar to those in the examples hereafter and in Makromolecular Chemie, (1992), 193(9), pages 2505-2517.

The water dispersible polymer particle stabilized by a hydrophobically capped oligomeric acrylamide dispersant may be made from any polymer via any number of heterogeneous preparative techniques to yield particles of from 0.01 to 100 μm in median diameter. Most preferably, the particles will range in size from 0.01 to 10 μm. It is known in the art that although there is no "universal dispersant" which can be used with all polymers and all variations of preparative methods, certain classes of dispersants can have more general applicability to a wide range of methods and conditions. For instance, a hydrophobically capped oligomeric acrylamide dispersant with more than 3 carbons attached to the amide nitrogen, when used in a miniemulsion of an acrylic difunctional monomer, provides inadequate stability.

Some representative classes of polymers useful in this invention include, but are not necessarily limited to polyesters and addition polymers of monomers containing α,β-ethylenic unsaturation. In preferred embodiments, they may be styrenic, acrylic, or a polyester-addition polymer hybrid. By styrenic it is meant synthesized from vinyl aromatic monomers and their mixtures such as styrene, t-butyl styrene, ethylvinylbenzene, chloromethylstyrene, vinyl toluene, styrene sulfonylchloride and the like. By acrylic is meant synthesized from acrylic monomers and their mixtures such as acrylic acid, or methacrylic acid, and their alkyl esters such as methyl methacrylate, ethyl methacrylate, butyl methacrylate, methyl acrylate, ethyl acrylate, butyl acrylate, hexyl acrylate, n-octyl acrylate, lauryl methacrylate, 2-ethylhexyl methacrylate, nonyl acrylate, benzyl methacrylate, the hydroxyalkyl esters of the same acids, such as, 2-hydroxyethyl acrylate, 2-hydroxyethyl methacrylate, and 2-hydroxypropyl methacrylate and the like. By polyester-addition polymer hybrid it is meant the free radical addition reaction product of a monomer containing α,β-ethylenic unsaturation (such as a styrenic, acrylic, vinyl ester or vinyl ether) with a polyester macromonomer containing unsaturated units either pendant or along its backbone.

The water dispersible polymer particle stabilized by a hydrophobically capped oligomeric acrylamide dispersant may be porous. Techniques to synthesize porous polymer particles are taught, for example, in U.S. Pat. Nos. 5,840,293, 5,993,805, 5,403,870, and 5,599,889, and Japanese Kokai Hei 5[1993]-222108, the disclosures of which are hereby incorporated by reference. For example, small particles made by emulsion, miniemulsion or dispersion polymerization using a hydrophobically capped oligomeric acrylamide dispersant may be agglomerated into porous particles. In another example, an inert fluid or porogen may be mixed with the monomers used in making the porous polymer particles. After polymerization is complete, the resulting polymeric particles are, at this point, substantially porous because the polymer has formed around the porogen thereby forming the pore network. This technique is described more fully in U.S. Pat. No. 5,840,293 referred to above.

A preferred method of preparing porous polymeric particles of this invention includes stabilizing a suspension or dispersion of ethylenically unsaturated monomer droplets and a porogen in an aqueous medium with a hydrophobically capped oligomeric acrylamide dispersant, polymerizing the monomer to form solid, porous polymeric particles, and optionally removing the porogen by vacuum stripping. The particles thus prepared have a porosity as measured by a specific surface area of about 35 $m^2/g$ or greater, preferably 100 $m^2/g$ or greater. The surface area is usually measured by B.E.T. nitrogen analysis known to those skilled in the art.

The water dispersible polymer particle stabilized by a hydrophobically capped oligomeric acrylamide dispersant may contain ionic groups. These ionic groups may be ammonium (primary, secondary, tertiary, or quaternary), pyridinium, imidazolium, alkylsulfonates, alkylthiosulfate, carboxylate, phosphonium or sulfonium. Copolymerizable, α,β-ethylenically unsaturated monomers containing a preformed ionic functionality can be used in any of the polymerization processes described herein. Suitable monomers which can be used include, for example, the following monomers and their mixtures: cationic ethylenically unsaturated monomers, for example, vinylbenzyltrimethyl-ammonium chloride, vinylbenzyldimethyl-dodecylammonium chloride, other vinylbenzylammonium salts in which the three other ligands on the nitrogen can be any alkyl or carbocyclic group including cyclic amines such as piperidine, the counter ions of which can be halides, sulfonates, phosphates, sulfates, etc., [2-(methacryloyloxy)ethyl]trimethyl-ammonium chloride, [2-(acryloyloxy)ethyl]-trimethylammonium p-toluene-sulfonate, and other acrylate and methacrylate ammonium salts in which the alkyl group connecting the acrylic function to the nitrogen can be $\geq 2$ carbon atoms long and the other three nitrogen ligands can be any alkyl or carbocyclic group including cyclic amines such as piperidine, and benzyl, 4-vinyl-1-methylpyridinium methyl sulfate, 3-methyl-1-vinylimidazolium methosulfate, and other vinylpyridinium and vinylimidazolium salts in which the other nitrogen ligand is any alkyl or cycloalkyl group, vinyltriphenyl-phosphonium bromide, vinylbenzyltriphenylphosphonium tosylate, and other phosphonium salts in which the other three phosphorous ligands are any aromatic or alkyl group. In a preferred embodiment, the cationic functionality is vinylbenzyltrimethylammonium chloride, vinylbenzyl-N-butylimidazolium chloride, vinylbenzyldimethyldodecylammonium chloride or vinylbenzyl-dimethyloctadecylammonium chloride.

Other suitable copolymerizable, α,β-ethylenically unsaturated monomers containing a preformed ionic functionality which can be used include, for example, the following monomers and their mixtures: anionic ethylenically unsaturated monomers such as 2-phosphatoethyl acrylate potassium salt, 3-phosphatopropyl methacrylate ammonium salt, and other acrylic and methacrylic esters of alkylphosphonates in which the alkyl group connecting the acrylic function to the phosphate function can be $\geq 2$ carbon atoms long, the counter ions of which can be alkali metal cations, quaternary ammonium cations, phosphonium cations, or the like, sodium methacrylate, potassium acrylate, and other salts of carboxylic acids, styrenesulfonic acid ammonium salt, methyltriphenylphosphonium styrenesulfonate, and other styrene sulfonic acid salts, 2-sulfoethyl methacrylate pyridinium salt, 3-sulfopropyl acrylate lithium salt, and other acrylic and methacrylic esters of alkylsulfonates, and other sulfonates such as ethylene sulfonic acid sodium salt. In a preferred embodiment, the anionic functionality is trimethylamine hydrochloride salt of methacrylic acid, dimethylbenzylamine hydrochloride salt of methacrylic acid, dimethyldodecyl-amine hydrochloride salt of methacrylic acid or methyltrioctylammonium salt of styrenesulfonic acid.

The ionic group can also be formed after the polymer particle is prepared by modifying non-ionic monomers to make them (or part of them) ionic. All of the cationic and anionic functionalities mentioned above can be incorporated by modifying a non-ionic polymer particle.

The water dispersible polymer particle stabilized by a hydrophobically capped oligomeric acrylamide dispersant may be crosslinked by incorporation of a monomer or monomers which are polyfunctional with regard to the free radical polymerization. Typical crosslinking monomers are aromatic divinyl compounds such as divinylbenzene, divinylnaphthalene or derivatives thereof, diethylene carboxylate esters and amides such as ethylene glycol dimethacrylate, diethylene glycol diacrylate, 1,4 butanediol diacrylate, 1,4 butanediol dimethacrylate, 1,3 butylene glycol diacrylate, 1,3 butylene glycol dimethacrylate, cyclohexane dimethanol diacrylate, cyclohexane dimethanol dimethacrylate, diethylene glycol diacrylate, diethylene glycol dimethacrylate, dipropylene glycol diacrylate, dipropylene glycol dimethacrylate, ethylene glycol diacrylate, ethylene glycol dimethacrylate, 1,6 hexanediol diacrylate, 1,6 hexanediol dimethacrylate, neopentyl glycol diacrylate, neopentyl glycol dimethacrylate, tetraethylene glycol diacrylate, tetraethylene glycol dimethacrylate, triethylene glycol diacrylate, triethylene glycol dimethacrylate, tripropylene glycol diacrylate, tripropylene glycol dimethacrylate, pentaerythritol triacrylate, trimethylolpropane triacrylate, trimethylolpropane trimethacrylate, dipentaerythritol pentaacrylate, di-trimethylolpropane tetraacrylate, pentaerythritol tetraacrylate, divinyl esters such as divinyl adipate, and other divinyl compounds such as divinyl sulfide or divinyl sulfone compounds of allyl methacrylate, allyl acrylate, cyclohexanedimethanol divinyl ether diallylphthalate, diallyl maleate, dienes such as butadiene and isoprene and mixtures thereof.

The hydrophobically capped oligomeric acrylamide dispersants of this invention may be used in emulsion (latex) polymerizations to afford polymer particles. Emulsion polymerization is a heterogeneous, free-radical-initiated chain polymerization in which a monomer or a mixture of monomers is polymerized in the presence of an aqueous solution of a surfactant to form a latex, which is a colloidal dispersion of polymer particles in an aqueous medium. Emulsion polymerization is well known in the art and is described, for example, in F. A. Bovey, *Emulsion Polymerization*, issued by Interscience Publishers Inc. New York, 1955, and P. A. Lovell and M. El-Aasser, *Emulsion Polymerization and Emulsion Polymers*, issued by John Wiley and Sons, Chichester, 1997.

The basic components of an emulsion polymerization include water, initiators, surfactants, monomers, and optional additives and addenda such as chain transfer agents, biocides, colorants, antioxidants, buffers, and rheological modifiers. Emulsion polymerizations can be carried out via a batch process, in which all of the components are present at the beginning of the reaction, a semibatch process, in which one or more of the ingredients is added continuously, or a continuous process, in which the ingredients are fed into a stirred tank or more than one tank in series and the product latex is continuously removed. Intermittent or "shot" addition of monomers may also be used.

The monomers useful in an emulsion polymerization will include 75-100% of water-immiscible monomers and 0-25% of water-miscible monomers. Water-immiscible monomers useful in this embodiment of this invention include methacrylic acid esters, such as methyl methacrylate, ethyl methacrylate, isobutyl methacrylate, 2-ethylhexyl methacrylate, benzyl methacrylate, phenoxyethyl methacrylate, cyclohexyl methacrylate and glycidyl methacrylate, acrylate esters such as methyl acrylate, ethyl acrylate, isobutyl acrylate, 2-ethylhexyl acrylate, benzyl methacrylate, phenoxyethyl acrylate, cyclohexyl acrylate, and glycidyl acrylate, styrenics such as styrene, α-methylstyrene, 3- and 4-chloromethylstyrene, halogen-substituted styrenes, and alkyl-substituted styrenes, vinyl halides and vinylidene halides, N-alkylated acrylamides and methacrylamides, vinyl esters such as vinyl acetate and vinyl benzoate, vinyl ether, allyl alcohol and its ethers and esters, and unsaturated ketones and aldehydes such as acrolein and methyl vinyl ketone, isoprene, butadiene and cyanoacrylate esters. In addition, any of the acrylate, styrenics, and crosslinking monomers listed previously in this document which are water-insoluble can be used.

Water-miscible monomers are useful in the present invention. Such monomers include the charged monomers that contain ionic groups as discussed previously. Other useful monomers include monomers containing hydrophilic, nonionic units such as poly(ethylene oxide) segments, carbohydrates, amines, amides, alcohols, polyols, nitrogen-containing heterocycles, and oligopeptides. Examples of nonionic, water-miscible monomers include, but are not limited to poly (ethylene oxide) acrylate and methacrylate esters, vinylpyridines, hydroxyethyl acrylate, glycerol acrylate and methacrylate esters, (meth)acrylamide, and N-vinylpyrrolidone.

Initiators which are useful in this embodiment of this invention include both water-soluble and water-insoluble initiators, although the former class is preferred. These include, but are not restricted to azo compounds, such as 2,2'-azobis (4-methoxy-2,4-dimethylvaleronitrile), (1-phenylethyl)azodiphenylmethane, 2-2'-azoisobutyronitrile (AIBN), 1,1'-azobis(1-cyclohexanedicarbonitrile), 4,4'-azobis(4-cyanovaleric acid), and 2,2'-azobis(2-amidinopropane) dihydrochloride, organic peroxides, organic hydroperoxides, peresters, and peracids such as benzoyl peroxide, lauryl peroxide, capryl peroxide, acetyl peroxide, t-butyl hydroperoxide, t-butyl perbenzoate, cumyl hydroperoxide, peracetic acid, 2,5-dimethyl-2,5-di(peroxybenzoate), and p-chlorobenzoyl peroxide, persulfate salts such as potassium, sodium and ammonium persulfate, disulfides, tetrazenes, and redox initiator systems such as $H_2O_2/Fe^{2+}$, persulfate/bisulfite, oxalic acid/$Mn^{3+}$, thiourea/$Fe^{3+}$, and benzoyl perozide/dimethylaniline. Preferred initiators for this embodiment of this invention include persulfate salts (optionally used in combination with bisulfite), 4,4'-azobis(4-cyanovaleric acid), and 2,2'-azobis(2-amidinopropane) dihydrochloride.

Emulsion polymerizations additionally require a stabilizer compound which is used to impart colloidal stability to the resultant latex particles. These compounds may be surfactants or protective colloids, which are oligomeric or macromolecular amphiphiles. Although the dispersant compounds of this invention are hydrophobically capped arcylamide oligomers and may function as surfactants, there exist a tremendous number of other known surfactant compounds. Good reference sources for surfactants are the *Surfactant Handbook* (GPO: Washington, D. C., 1971) and *McCutcheon's Emulsifiers and Detergents* (Manufacturing Confectioner Publishing Company: Glen Rock, 1992). Surfactants can be anionic, cationic, zwitterionic, neutral, low molecular weight, macromolecular, synthetic, extracted, or derived from natural sources. Some examples include, but are not necessarily limited to: sodium dodecylsulfate, sodium dodecylbenzenesulfonate, sulfosuccinate esters, such as those sold under the AEROSOL® trade name, fluorosurfactants, such as those sold under the ZONYL® and FLUORAD® trade names, ethoxylated alkylphenols, such as TRITON® X-100 and TRITON® X-705, ethoxylated alkylphenol sulfates, such as RHODAPEX® CO-436, phosphate ester surfactants such as GAFAC® RE-90, hexadecyltrimethylammonium bromide, polyoxyethylenated long-chain amines and their quaternized derivatives, ethoxylated silicones, alkanolamine condensates, polyethylene oxide-co-polypropylene oxide block copolymers, such as those sold under the PLURONIC® and TECTRONIC® trade names, N-alkylbetaines, N-alkyl amine oxides, and fluorocarbon-poly(ethylene oxide) block surfactants, such as FLUORAD® FC-430. Protective colloids useful in this invention include, but are not necessarily limited to: poly(ethylene oxide), hydroxyethyl cellulose, poly (vinyl alcohol), poly(vinyl pyrrolidone), polyacrylamides, polymethacrylamides, sulfonated polystyrenes, alginates, carboxy methyl cellulose, polymers and copolymers of dimethylaminoethyl methacrylate, water soluble complex resinous amine condensation products of ethylene oxide, urea and formaldehyde, polyethyleneimine, casein, gelatin, albumin, gluten and xanthan gum.

The hydrophobically capped acrylamide oligomers of this invention may be used in emulsion polymerizations either as the sole dispersant compound present in the reaction or in tandem with one or more surfactant compounds, which may include those listed above.

The hydrophobically capped oligomeric acrylamide dispersants of this invention may be used in suspension, miniemulsion or microsuspension polymerizations. The terms "miniemulsion" and "microsuspension" will be used interchangeably throughout this document because they describe processes which are arguably identical. "Suspension polymerization" refers to a process in which a polymerizable liquid is dispersed as droplets in a continuous aqueous medium and polymerized under agitation. Any of the initiators described above for emulsion polymerization can be used in suspension, and miniemulsion/microsuspension polymerizations. Preferably, organic-soluble initiators will be used. Normally, this process is carried out in the presence of a "granulating agent", such as a lyophilic polymer (starch, natural gums, polyvinyl alcohol or the like) or an insoluble fine powder such as calcium phosphate. These granulating agents help to obtain a dispersion of droplets of the polymerizable liquid but do not provide sufficient stabilization of the dispersion so that the dispersed droplets are stable in the absence of agitation. Therefore, in this method, it is necessary to carry out the polymerization under continuous high-energy mechanical agitation, since otherwise extensive coalescence of the droplets will occur, with separation of a bulk phase of the water immiscible, polymerizable material or the formation of large amounts of coagulum. Because this process depends on the details of the shear field in the reactor, and on the changing viscosity of the polymerizing dispersed phase, it is difficult to control reproducibly, is not readily scalable, and gives broad particle size distributions (PSDs). Suspension polymerization is further described in U.S. Pat. Nos. 5,889,285, 5,274,057, 4,601,968, 4,592,990, R. Arshady "Suspension, emulsion, and dispersion polymerization: A methodological survey" *Colloid Polym. Sci.* 270: 717-732 (1992) and H. G. Yuan, G. Kalfas, W. H Ray *JMS-Rev. Macromol Chem. Phys.* C31 (2-3): 215 (1991).

The term miniemulsion or microsuspension polymerization also refers to a process in which the water-immiscible polymerizable liquid is dispersed in an aqueous medium. In this process, as in suspension polymerization, the water insoluble monomer is dispersed in the presence of a dispersion stabilizer or granulating agent to the desired size by using a mechanical shearing device such as an agitator, a high pressure homogenizer, colloid mill, ultrasonic horn or the like. In contrast to simple suspension polymerization, however, in miniemulsion or microsuspension polymerization, the polymerization can then be carried out with no or minimal stirring (only enough to prevent creaming and provide good thermal transfer). Various dispersion stabilizers or granulating agents are well-known in the art (for example, surfactants such as sodium dodecyl sulfate or sodium dioctylsulfosuccinate, and hydrophilic polymers, for example polyvinyl alcohol, gelatin, methyl cellulose, methylhydroxypropyl cellulose, ethyl cellulose, sodium salt of carboxymethyl cellulose, polyacrylic acid and salts thereof, starch, gum, alginic acid salts, zein, casein). In some cases, granulating agents useful for suspension polymerization are also useful for microsuspension polymerization. Which process occurs is a function of the nature of the oil phase, that is, whether the dispersion is stable in the absence of mechanical agitation or whether it will coalesce before or during the polymerization process. Suspension polymerization is used to provide easily filterable polymer products, but these products are generally of ill-defined particle size and size distribution, usually of between 50-1000 micrometers. Miniemulsion and microsuspension polymerization can be used to provide products with mean particle sizes less than 20 micrometers. Miniemulsion and microsuspension polymerization are described in U.S. Pat. Nos. 5,858,634, 5,492,960, J. Ugelstad, M. S. El-Aasser, and J. W. Vanderhoff, *J. Poly. Sci. Polym. Lett. Ed.*, 11, 503 (1973) and Sudol, E. D. and El-Aasser, M. in *Emulsion Polymerization and Emulsion Polymers*, Lovell, P. A. and El-Aaser, M. Eds.; John Wiley and Sons Ltd.: New York, 1997; p. 699-721.

The polymer particles of this invention may comprise polyester-addition polymer hybrid particles. Such polyester-containing particles are preferably prepared via suspension, miniemulsion, or microsuspension polymerization (although an emulsion polymerization may also be employed) in the presence of additional monomers containing α,β-ethylenic unsaturation. The polyester macromonomers useful for this invention are branched or unbranched and contain chemical unsaturation. The polyesters may have any glass transition temperature (Tg), provided the polyester is sufficiently soluble in the organic phase of the polymerization mixture. The number average molecular weight (Mn) of the polyester macromonomer may be between 1,000 and 250,000. Preferably, the number average molecular weight is between 1,000 and 30,000 g/mol.

As is well known in the art, polyesters are condensation products of polybasic acids or of corresponding acid equivalent derivatives such as esters, anhydrides or acid chlorides and polyhydric alcohols. Whenever "diacids" or "polyacids" are referred to in this document, the corresponding acid equivalent derivatives such as esters, anhydrides or acid chlorides are also included by reference. Polymerizable unsaturation may be introduced into the molecule by the selection of a polybasic acid or polyhydric alcohol which contains α,β-ethylenic unsaturation. In most cases, the unsaturation will be contained within the polybasic acid unit. Preferably, the unsaturated polyester will contain at least 20 mole percent unsaturated diacid units based on total diacid units. Optionally, one or more additional polyacids common in the art of polycondensation may be used in addition to the unsaturated polyacid. Thus ethylenically unsaturated polyacids include, but are not necessarily limited to maleic, fumaric, itaconic, phenylenediacrylic acid, citraconic and mesaconic acid. Additional polyacids which do not contain chemical unsaturation and can be used in polyesters are described in WO 01/00703. These diacids can include, but are not necessarily limited to malonic, succinic, glutaric, adipic, pimelic, azelaic, and sebacic acids, phthalic, isophthalic, terephthalic, tetrachlorophthalic, tetrahydrophthalic, trimellitic, trimesic, isomers of naphthalenedicarboxylic acid, chlorendic acid, and pyromellitic acid.

Ethylenically unsaturated groups can also be introduced into the polyester by synthetic modification of a precursor polyester. For example, a polyester with a high alcohol number can be reacted with an anhydride or acid chloride of acrylic acid or methacrylic acid in order to introduce ethylenically unsaturated units.

Polyesters which are suitable for this invention can furthermore be comprised of any of a wide variety of polyhydric alcohols which are well known in the art of polycondensation and may be aliphatic, alicyclic, or aralkyl. A description of suitable polyhydric alcohols is given in WO 01/00703. These alcohols can include, but are not necessarily limited to ethylene glycol, 1,3-propylene glycol, 1,6-hexanediol, 1,10-decanediol, etc., 1,4-cyclohexanedimethanol, 1,4-cyclohexanediol, hydroquinone bis (hydroxyethyl) ether, diethylene glycol, neopentyl glycol, bisphenols such as bisphenol A, ethylene oxide and propylene oxide adducts of bisphenol A, pentaerythritol, trimethylolpropane, and polyester polyols, such as that obtained by the ring-opening polymerization of ∈-caprolactone. Additionally, A-B type polycondensation monomers which contain both hydroxyl and acid derivative functions can be used as well as monoacids and monoalcohols.

The water dispersible polymer particle stabilized by a hydrophobically capped oligomeric acrylamide dispersant may be made by a dispersion polymerization. Dispersion polymerization is a technique in which a monomer or a monomer mixture is polymerized in a solvent or solvent mixture, which is a solvent for the monomer and a non-solvent for the polymer. A stabilizer compound is used to produce a colloidally stable dispersion. A discussion of this type of polymerization is given by J. L. Cawse in *Emulsion Polymerization and Emulsion Polymers*; Lovell, P. A. and El-Aaser, M. Eds.; John Wiley and Sons Ltd.: New York, 1997; p. 699-721). It is known in the art that steric (nonionic) stabilizers are especially important in this type of polymerization.

The present invention also includes a heterogeneous method for forming polymer particles comprising providing a water immiscible organic phase comprising at least one monomer dispersed in a continuous water phase and a hydrophobically capped oligomeric acrylamide, and polymerizing said organic phase to yield polymer particles stabilized with hydrophobically capped oligomeric acrylamide. Also included in the present invention is a heterogeneous method for forming polymer particles comprising providing a water immiscible organic dispersed in a continuous water phase, polymerizing said organic phase, and adding hydrophobically capped oligomeric acrylamide to yield polymer particles stabilized with hydrophobically capped oligomeric acrylamide.

The water dispersible polymer particle stabilized by a hydrophobically capped oligomeric acrylamide dispersant may be made by solvent evaporation. This involves first forming a solution of a polymer in a solvent that is immiscible with water (along with any required addenda), and then suspending the polymer-solvent solution in water containing a hydrophobically capped oligomeric acrylamide dispersant. The resulting suspension is subjected to high shear action to reduce the size of the polymer-solvent droplets. The shearing action is optionally removed and the polymer-solvent droplets coalesce to the extent allowed by the dispersant to form coalesced polymer-solvent droplets. The solvent is removed from the drops to form solidified polymer particles which are then optionally isolated from the suspension by filtration or other suitable means.

Any suitable solvent that will dissolve the polymer and which is also immiscible with water may be used, such as for example, chloromethane, dichloromethane, ethyl acetate, n-propyl acetate, iso-propyl acetate, vinyl chloride, methyl ethyl ketone (MEK), trichloromethane, carbon tetrachloride, ethylene chloride, trichloroethane, toluene, xylene, cyclohexanone, 2-nitropropane and the like. Preferred are n-propyl acetate, iso-propyl acetate, ethyl acetate and methylene chloride. Particularly preferred is n-propyl acetate or ethyl acetate.

The polymer particles of this invention can additionally contain a wide variety of other formulation components and addenda which will be present either within the particle itself or within the aqueous serum. Additional components and addenda can include, but are not necessarily limited to chain transfer agents, biocides, colorants, antioxidants, buffers, and rheological modifiers. Representative examples of chain transfer agents include chloroform, carbon tetrachloride, carbon tetrabromide, isopropanol, alkylthiols (such as mercaptoethanol and dodecanethiol), and amines (such as buytlamine and triethylamine). Some common biocides and fungicides include pentachlorophenol, tetrachloroisophthalonitrile, dibutyltin oxide, 2-n-octyl-4-isothiazolin-3-one, and 1-(3-chloroallyl)-3,5,7-tri-aza-1-adamantane chloride. Colorants useful in this invention may be soluble in either the polymer or serum phase or may exist as insoluble pigment. The colorant may be mineral (inorganic) colorant (such as iron oxide) a synthetic colorant (such as copper phthalocyanine or Rhodamine B) or may be an extract or concentrate derived from a natural source. A very large number of dyes are known and the selection will be dictated by the end use of the polymer particles. *The Colour Index*, (Society of Dyers and Colourists, Bradford, 1971) provides a comprehensive list of known colorants. Antioxidants and stabilizer compounds may be incorporated within the particles or the particle dispersions in order to prevent degradation due to UV irradiation, airborne oxidants, or adventitious degradative compounds. A list of such compounds is given in K. L. Hoy, *J. Paint. Tech.*, vol. 45 p. 51 (1973). These include hindered phenols (such as 2,6-di-tert-butyl-p-cresol), aromatic amines (such as N-phenyl-N-(1,3-dimethylbutyl)-p-phenylenediamine, hindered amines (such as 2,2,6,6-tetramethyl-4-piperidinol), peroxide decomposers, (such as dialkyl thiodipropionates), phosphites, and metal chelators, such as EDTA. Buffers are often added to emulsion polymerizations to regulate the pH of the reacting system and to limit flocculation, precipitation of certain reagents, and crosslinking. Buffers can also be a factor in controlling particle size. Sodium bicarbonate, sodium carbonate, and phosphate buffers are commonly used for this purpose. Rheological modifiers may be present in the serum of polymer particle dispersions to impart coatability and spreading properties. Representative rheological modifiers include hydroxyethyl cellulose, hydrophobically modified ethylene oxide urethane block copolymers (HUER), and hydrophobically modified alkali soluble emulsions.

One preferred use of the particles of this invention is as a component of an inkjet receiving or recording element for use in an inkjet printing system. This element will provide good quality, crack-free coatings, almost instantaneous ink dry time and good image quality. Dye stability is also enhanced.

A typical recording element, especially an inkjet element, will comprise a support coated with one or more layers, at least one of which will contain the water-dispersible particles of this invention, which are preferably porous, in a polymeric binder. In a typical formulation for this layer, the water-dispersible beads and the polymeric binder will be present in ratios of 70:30 to 95:5. A preferred ratio for the porous polymeric particles to the binder is 85:15. The binder will preferably be vinyl alcohol polymers or copolymers, polyester ionomers, water-dispersible polyurethanes, gelatin, or a low Tg latex. The layer may also optionally contain such additional components as thickeners, surfactants, crosslinkers, antioxidants, and UV absorbers. The thickness of the layer can range from 5-60 microns. The recording element may also comprise additional layers, which will be present for such purposes as handleability and adhesion to the support.

The image receiving or recording layer may contain a polymeric binder and polymeric particles stabilized by a hydrophobically capped oligomeric acrylamide dispersant in any ratio. Preferably, the image-receiving or recording layer may also contain a polymeric binder in an amount insufficient to alter the porosity of the porous recording layer. In a preferred embodiment, the polymeric binder is a hydrophilic polymer such as poly(vinyl alcohol) polymers and co-polymers, polyvinylpyrrolidone, gelatin, cellulose ethers, polyoxazolines, poly(vinylacetamides), partially hydrolyzed poly (vinyl acetate/vinyl alcohol), poly(acrylic acid), poly (acrylamide), poly(alkylene oxide), sulfonated or phosphated polyesters and polystyrenes, casein, zein, albumin, chitin, chitosan, dextran, pectin, collagen derivatives, collodian, agar-agar, arrowroot, guar, carrageenan, tragacanth, xanthan, rhamsan and the like. In another preferred embodiment of the invention, the hydrophilic polymer is poly(vinyl alcohol), hydroxypropyl cellulose, hydroxypropyl methyl cellulose, gelatin, or a poly(alkylene oxide). In still another preferred embodiment, the polymeric binder is a low Tg latex such as poly(styrene-co-butadiene), polyurethane, polyester, poly(n-butyl acrylate), poly(n-butyl methacrylate), poly(2-ethyl-hexyl acrylate), a copolymer of n-butylacrylate and ethylacrylate, a copolymer of vinylacetate and n-butylacrylate, etc. The polymeric binder should be chosen so that it is compatible with the aforementioned particles. A preferred binder may comprise a cross-linkable polymer containing hydroxyl groups in an amount of from about 20 to about 150 $g/m^2$ The amount of binder used should be sufficient to impart cohesive strength to the ink recording element, but should also be minimized so that the interconnected pore structure formed by the aggregates is not filled in by the binder. In a preferred embodiment of the invention, the binder is present in an amount of from about 5 to about 20 weight %. The particles may be present in said image-receiving or recording layer in an amount of from about 3 to about 50 $g/m^2$. Most preferably, the image-receiving or recording layer contains from about 0.20 to about 22.0 $g/m^2$ poly(vinyl alcohol) binder and from about 3.0 to about 30 $g/m^2$ polymeric particles.

The thickness of the image-recording layer may range from about 5 to about 60 μm, preferably from about 10 to about 40 μm. The coating thickness required is determined through the need for the coating to act as a sump for absorption of ink solvent and the need to hold the ink near the coating surface In addition to the image-recording layer, the recording element may also contain a base or under layer, next to the support, the function of which is to absorb the solvent from the ink. Materials useful for this layer include inorganic particles and polymeric binder. The binder may be a water-insoluble or water-dispersible polymer and may be present in the subbing layer in an amount of from about 1 to about 5 $g/m^2$. This layer may include adhesive materials, absorbent materials and the like. It may also be a subbing layer which may include a polymeric binder and a borate or a borate derivative in an amount of from about 5 to about 50 $g/m^2$, preferably 10 to 25 $g/m^2$. The borate or borate derivative may preferably include sodium tetraborate, boric acid, phenyl boronic acid or butyl boronic acid.

In addition to the image-recording layer, the recording element may also contain an over layer above the image-recording layer, the function of which is to provide gloss. Materials useful for this layer include sub-micron inorganic or organic particles and/or polymeric binder. This layer may also serve as a protective layer to protect the image recording layer from environmental conditions, such as water, gases, pollution and the like. Protection may also be provided against UV radiation or oxidation. The layer may serve as a transport layer to facilitate transport through manufacturing and end use equipment such as printers.

The support for the ink recording element used in the invention can be any of those usually used for inkjet receivers, such as resin-coated paper, paper, polyesters, or microporous materials such as polyethylene polymer-containing material sold by PPG Industries, Inc., Pittsburgh, Pa. under the trade name of Teslin®, Tyvek® synthetic paper (DuPont Corp.), impregnated paper such as Duraform®, and OPPalyte® films (Mobil Chemical Co.) and other composite films listed in U.S. Pat. No. 5,244,861. Opaque supports include plain paper, coated paper, synthetic paper, voided plastic material, photographic paper support, melt-extrusion-coated paper, and laminated paper, such as biaxially oriented support laminates. Biaxially oriented support laminates are described in U.S. Pat. Nos. 5,853,965, 5,866,282, 5,874,205, 5,888,643, 5,888,681, 5,888,683, and 5,888,714, the disclosures of which are hereby incorporated by reference. These biaxially oriented supports include a paper base and a biaxially oriented polyolefin sheet, typically polypropylene, laminated to one or both sides of the paper base. Transparent supports include glass, cellulose derivatives, e.g., a cellulose ester, cellulose triacetate, cellulose diacetate, cellulose acetate propionate, cellulose acetate butyrate, polyesters, such as poly (ethylene terephthalate), poly(ethylene naphthalate), poly(1, 4-cyclohexanedimethylene terephthalate), poly(butylene terephthalate), and copolymers thereof, polyimides, polyamides, polycarbonates, polystyrene, polyolefins, such as polyethylene or polypropylene, polysulfones, polyacrylates, polyetherimides, and mixtures thereof. The papers listed above include a broad range of papers, from high end papers, such as photographic paper to low end papers, such as newsprint. In a preferred embodiment, Ektacolor paper made by the Eastman Kodak Co. is employed.

The support used in the invention may have a thickness of from about 50 to about 500 μm, preferably from about 75 to 300 μm. Antioxidants, antistatic agents, plasticizers and other known additives may be incorporated into the support, if desired.

In order to improve the adhesion of the image-recording layer to the support, the surface of the support may be subjected to a corona-discharge treatment prior to applying the image-recording layer. The adhesion of the image-recording layer to the support may also be improved by coating a subbing layer on the support. Examples of materials useful in a subbing layer include halogenated phenols and partially hydrolyzed vinyl chloride-co-vinyl acetate polymer.

The coating composition can be coated either from water or organic solvents, however water is preferred. The total solids content should be selected to yield a useful coating thickness in the most economical way, and for particulate coating formulations, solids contents from 10-40 wt. % are typical.

Coating compositions employed in the invention may be applied by any number of well known techniques, including dip-coating, wound-wire rod coating, doctor blade coating, gravure and reverse-roll coating, slide coating, bead coating, extrusion coating, curtain coating and the like. Known coating and drying methods are described in further detail in Research Disclosure no. 308119, published December 1989, pages 1007 to 1008. Slide coating is preferred, in which the base layers and overcoat may be simultaneously applied.

After coating, the layers are generally dried by simple evaporation, which may be accelerated by known techniques such as convection heating.

The coating composition may be applied to one or both substrate surfaces through conventional pre-metered or post-metered coating methods such as blade, air knife, rod, roll coating, etc. The choice of coating process would be determined from the economics of the operation and in turn, would determine the formulation specifications such as coating solids, coating viscosity, and coating speed.

After coating, the ink recording element may be subject to calendering or supercalendering to enhance surface smoothness. In a preferred embodiment of the invention, the inkjet recording element is subject to hot soft-nip calendering at a temperature of about 65° C. and a pressure of 14000 kg/m$^2$ at a speed of from about 0.15 m/s to about 0.3 m/s.

In order to impart mechanical durability to an ink recording element, crosslinkers which act upon the binder discussed above may be added in small quantities. Such an additive improves the cohesive strength of the layer. Crosslinkers such as carbodiimides, polyfunctional aziridines, aldehydes, isocyanates, epoxides, polyvalent metal cations, and the like may all be used.

To improve colorant fade, UV absorbers, radical quenchers or antioxidants may also be added to the image-recording layer as is well known in the art. Other additives include pH modifiers, adhesion promoters, rheology modifiers, surfactants, biocides, lubricants, dyes, optical brighteners, matte agents, antistatic agents, etc. In order to obtain adequate coatability, additives known to those familiar with such art such as surfactants, defoamers, alcohol and the like may be used. A common level for coating aids is 0.01 to 0.30 wt. % active coating aid based on the total solution weight. These coating aids can be nonionic, anionic, cationic or amphoteric. Specific examples are described in MCCUTCHEON's Volume 1: Emulsifiers and Detergents, 1995, North American Edition.

Ink used to image the recording elements of the present invention are well-known in the art. The ink compositions used in inkjet printing typically are liquid compositions comprising a solvent or carrier liquid, dyes or pigments, humectants, organic solvents, detergents, thickeners, preservatives, and the like. The solvent or carrier liquid can be solely water or can be water mixed with other water-miscible solvents such as polyhydric alcohols. Inks in which organic materials such as polyhydric alcohols are the predominant carrier or solvent liquid may also be used. Particularly useful are mixed solvents of water and polyhydric alcohols. The dyes used in such compositions are typically water-soluble direct or acid type dyes. Such liquid compositions have been described extensively in the prior art including, for example, U.S. Pat. Nos. 4,381,946, 4,239,543 and 4,781,758, the disclosures of which are hereby incorporated by reference.

Used herein, the phrase 'imaging element' comprises an imaging support as described above along with an image receiving or recording layer as applicable to multiple techniques governing the transfer of an image onto the imaging element. Such techniques include thermal dye transfer with thermosensitive imaging materials, electrophotographic printing, or inkjet printing, as well as a support for photographic silver halide images. As used herein, the phrase "photographic element" is a material that utilizes photosensitive silver halide in the formation of images. The stabilized particle of the present invention may be used in a single technique or may be used in a hybrid system combining one or more technique. An example of a hybrid system might be an inkjet printing application on a photographic element.

The thermal ink or dye image-receiving or recording layer of the receiving or recording elements of the invention may comprise, for example, a polycarbonate, a polyurethane, a polyester, polyvinyl chloride, poly(styrene-co-acrylonitrile), poly(caprolactone), or mixtures thereof. The ink or dye image-receiving or recording layer may be present in any amount that is effective for the intended purpose. An overcoat layer may be further coated over the ink or dye-receiving or recording layer, such as described in U.S. Pat. No. 4,775,657 of Harrison et al.

Ink or dye-donor elements that are used with the ink or dye-receiving or recording element of the invention conventionally comprise a support having thereon an ink or dye containing layer. Any ink or dye can be used in the ink or dye-donor employed in the invention, provided it is transferable to the ink or dye-receiving or recording layer by the action of heat. Ink or dye donors applicable for use in the present invention are described, e.g., in U.S. Pat. Nos. 4,916,112, 4,927,803, and 5,023,228. As noted above, ink or dye-donor elements are used to form an ink or dye transfer image. Such a process comprises image-wise-heating an ink or dye-donor element and transferring an ink or dye image to an ink or dye-receiving or recording element as described above to form the ink or dye transfer image. The thermal ink or dye transfer method of printing, an ink or dye donor element may be employed which compromises a poly(ethylene terephthalate) support coated with sequential repeating areas of cyan, magenta, and yellow ink or dye, and the ink or dye transfer steps are sequentially performed for each color to obtain a three-color ink or dye transfer image. When the process is only performed for a single color, then a monochrome ink or dye transfer image is obtained.

Thermal printing heads which can be used to transfer ink or dye from ink or dye-donor elements to receiving or recording elements of the invention are available commercially. There can be employed, for example, a Fujitsu Thermal Head (FTP-040 MCS001), a TDK Thermal Head F415 HH7-1089, or a Rohm Thermal Head KE 2008-F3. Alternatively, other known sources of energy for thermal ink or dye transfer may be used, such as lasers as described in, for example, GB No. 2,083,726A.

A thermal ink or dye transfer assemblage may comprise (a) an ink or dye-donor element, and (b) an ink or dye-receiving or recording element as described above, the ink or dye-receiving or recording element being in a superposed relationship with the ink or dye-donor element so that the ink or dye layer of the donor element is in contact with the ink or dye image-receiving or recording layer of the receiving or recording element.

When a three-color image is to be obtained, the above assemblage is formed on three occasions during the time when heat is applied by the thermal printing head. After the first dye is transferred, the elements are peeled apart. A second dye-donor element (or another area of the donor element with a different dye area) is then brought in register with the dye-receiving or recording element and the process repeated. The third color is obtained in the same manner.

The electrographic and electrophotographic processes and their individual steps have been well described in the prior art. The processes incorporate the basic steps of creating an electrostatic image, developing that image with charged, colored particles (toner), optionally transferring the resulting developed image to a secondary substrate, and fixing the image to the substrate. There are numerous variations in these processes and basic steps, the use of liquid toners in place of dry toners is simply one of those variations.

The first basic step, creation of an electrostatic image, can be accomplished by a variety of methods. In one form, the electrophotographic process of copiers uses imagewise photodischarge, through analog or digital exposure, of a uniformly charged photoconductor. The photoconductor may be a single-use system, or it may be rechargeable and reimageable, like those based on selenium or organic photoreceptors.

In an alternate electrographic process, electrostatic images are created ionographically. The latent image is created on dielectric (charge-holding) medium, either paper or film. Voltage is applied to selected metal styli or writing nibs from an array of styli spaced across the width of the medium, causing a dielectric breakdown of the air between the selected styli and the medium. Ions are created, which form the latent image on the medium.

Electrostatic images, however generated, are developed with oppositely charged toner particles. For development with liquid toners, the liquid developer is brought into direct contact with the electrostatic image. Usually a flowing liquid is employed to ensure that sufficient toner particles are available for development. The field created by the electrostatic image causes the charged particles, suspended in a nonconductive liquid, to move by electrophoresis. The charge of the latent electrostatic image is thus neutralized by the oppositely charged particles. The theory and physics of electrophoretic development with liquid toners are well described in many books and publications.

If a reimageable photoreceptor or an electrographic master is used, the toned image is transferred to paper (or other substrate). The paper is charged electrostatically, with the polarity chosen to cause the toner particles to transfer to the paper. Finally, the toned image is fixed to the paper. For self-fixing toners, residual liquid is removed from the paper by air-drying or heating. Upon evaporation of the solvent, these toners form a film bonded to the paper. For heat-fusible toners, thermoplastic polymers are used as part of the particle. Heating both removes residual liquid and fixes the toner to paper.

When used as inkjet imaging media, the recording elements or media typically comprise a substrate or a support material having on at least one surface thereof an ink-receiving or recording/recording or image-forming layer. If desired, in order to improve the adhesion of the inkjet receiving or recording layer to the support, the surface of the support may be corona-discharge-treated prior to applying the solvent-absorbing layer to the support or, alternatively, an undercoating, such as a layer formed from a halogenated phenol or a partially hydrolyzed vinyl chloride-vinyl acetate copolymer, can be applied to the surface of the support. The inkjet receiving or recording layer is preferably coated onto the support layer from water or water-alcohol solutions at a dry thickness ranging from 3 to 75 micrometers, preferably 8 to 50 micrometers.

Any known inkjet receiver layer can be used in combination with other particulate materials. For example, the ink receiving or recording layer may consist primarily of inorganic oxide particles such as silicas, modified silicas, clays, aluminas, fusible beads such as beads comprised of thermoplastic or thermosetting polymers, non-fusible organic beads, or hydrophilic polymers such as naturally-occurring hydrophilic colloids and gums such as gelatin, albumin, guar, xantham, acacia, chitosan, starches and their derivatives, and the like, derivatives of natural polymers such as functionalized proteins, functionalized gums and starches, and cellulose ethers and their derivatives, and synthetic polymers such as polyvinyloxazoline, polyvinylmethyloxazoline, polyoxides, polyethers, poly(ethylene imine), poly(acrylic acid), poly (methacrylic acid), n-vinyl amides including polyacrylamide and polyvinylpyrrolidone, and poly(vinyl alcohol), its derivatives and copolymers, and combinations of these materials. Hydrophilic polymers, inorganic oxide particles, and organic beads may be present in one or more layers on the substrate and in various combinations within a layer.

A porous structure may be introduced into ink receiving or recording layers comprised of hydrophilic polymers by the addition of ceramic or hard polymeric particulates, by foaming or blowing during coating, or by inducing phase separation in the layer through introduction of non-solvent. In general, it is preferred for the base layer to be hydrophilic, but not porous. This is especially true for photographic quality prints, in which porosity may cause a loss in gloss. In particular, the ink receiving or recording layer may consist of any hydrophilic polymer or combination of polymers with or without additives as is well known in the art.

If desired, the ink receiving or recording layer can be overcoated with an ink-permeable, anti-tack protective layer such as, for example, a layer comprising a cellulose derivative or a cationically-modified cellulose derivative or mixtures thereof. An especially preferred overcoat is poly β-1,4-anhydro-glucose-g-oxyethylene-g-(2'-hydroxypropyl)-N,N-dimethyl-N-dodecylammonium chloride. The overcoat layer is non porous, but is ink permeable and serves to improve the optical density of the images printed on the element with water-based inks. The overcoat layer can also protect the ink receiving or recording layer from abrasion, smudging, and water damage. In general, this overcoat layer may be present at a dry thickness of about 0.1 to about 5 μm, preferably about 0.25 to about 3 μm.

In practice, various additives may be employed in the ink receiving or recording layer and overcoat. These additives include surface active agents such as surfactant(s) to improve coatability and to adjust the surface tension of the dried coating, acid or base to control the pH, antistatic agents, suspending agents, antioxidants, hardening agents to cross-link the coating, antioxidants, UV stabilizers, light stabilizers, and the like. In addition, a mordant may be added in small quantities (2%-10% by weight of the base layer) to improve waterfastness. Useful mordants are disclosed in U.S. Pat. No. 5,474,843.

The layers described above, including the ink receiving or recording layer and the overcoat layer, may be coated by conventional coating means onto a transparent or opaque support material commonly used in this art. Coating methods may include, but are not limited to, blade coating, wound wire rod coating, slot coating, slide hopper coating, gravure, curtain coating, and the like. Some of these methods allow for simultaneous coatings of both layers, which is preferred from a manufacturing economic perspective.

The IRL (ink or dye receiving layer) may be coated over a tie layer (TL). There are many known formulations which may be useful as ink or dye receiving or recording layers. The primary requirement is that the IRL is compatible with the inks which it will be imaged so as to yield the desirable color gamut and density. As the ink drops pass through the IRL, the ink or dyes are retained or mordanted in the IRL, while the ink solvents pass freely through the IRL and are rapidly absorbed by the TL. Additionally, the IRL formulation is preferably coated from water, exhibits adequate adhesion to the TL, and allows for easy control of the surface gloss.

For example, Misuda et al in U.S. Pat. Nos. 4,879,166, 5,264,275, 5,104,730, 4,879,166, and Japanese Patents 1,095,091, 2,276,671, 2,276,670, 4,267,180, 5,024,335, and 5,016,517 disclose aqueous based IRL formulations comprising mixtures of psuedo-bohemite and certain water soluble resins. Light in U.S. Pat. Nos. 4,903,040, 4,930,041, 5,084,338, 5,126,194, 5,126,195, and 5,147,717 discloses aqueous-based IRL formulations comprising mixtures of vinyl pyrrolidone polymers and certain water-dispersible and/or water-soluble polyesters, along with other polymers and addenda. Butters et al in U.S. Pat. Nos. 4,857,386 and 5,102,717 disclose ink-absorbent resin layers comprising mixtures of vinyl pyrrolidone polymers and acrylic or methacrylic polymers. Sato et al in U.S. Pat. No. 5,194,317 and Higuma et al in U.S. Pat. No. 5,059,983 disclose aqueous-coatable IRL formulations based on poly(vinyl alcohol). Iqbal in U.S. Pat. No. 5,208,092 discloses water-based IRL formulations comprising vinyl copolymers which are subsequently cross-linked. In addition to these examples, there may be other known or contemplated IRL formulations which are consistent with the aforementioned primary and secondary requirements of the IRL, all of which fall under the spirit and scope of the current invention.

The IRL may also contain varying levels and sizes of matting agents for the purpose of controlling gloss, friction, and/or fingerprint resistance, surfactants to enhance surface uniformity and to adjust the surface tension of the dried coating, mordanting agents, antioxidants, UV absorbing compounds, light stabilizers, and the like.

It may also be desirable to overcoat the IRL for the purpose of enhancing the durability of the imaged element. Such overcoats may be applied to the IRL either before or after the element is imaged. For example, the IRL can be overcoated with an ink-permeable layer through which inks freely pass. Layers of this type are described in U.S. Pat. Nos. 4,686,118, 5,027,131, and 5,102,717. Alternatively, an overcoat may be added after the element is imaged. Any of the known laminating films and equipment may be used for this purpose. The inks used in the aforementioned imaging process are well known, and the ink formulations are often closely tied to the specific processes, i.e., continuous, piezoelectric, or thermal. Therefore, depending on the specific ink process, the inks may contain widely differing amounts and combinations of solvents, colorants, preservatives, surfactants, humectants, and the like. Inks preferred for use in combination with the image recording elements of the present invention are water-based. However, it is intended that alternative embodiments of the image-recording elements as described above, which may be formulated for use with inks which are specific to a given ink-recording process or to a given commercial vendor, fall within the scope of the present invention.

In another embodiment, in order to produce photographic elements, the composite support sheet is coated with a photographic element or elements. The photographic elements can be single color elements or multicolor elements. Multicolor elements contain image ink or dye-forming units sensitive to each of the three primary regions of the spectrum. Each unit can comprise a single emulsion layer or multiple emulsion layers sensitive to a given region of the spectrum. The layers of the element, including the layers of the image-forming units, can be arranged in various orders as known in the art. In an alternative format, the emulsions sensitive to each of the three primary regions of the spectrum can be disposed as a single segmented layer.

The photographic emulsions useful for this invention are generally prepared by precipitating silver halide crystals in a colloidal matrix by methods conventional in the art. The colloid is typically a hydrophilic film forming agent such as gelatin, alginic acid, or derivatives thereof.

The crystals formed in the precipitation step are washed and then chemically and spectrally sensitized by adding spectral sensitizing dyes and chemical sensitizers, and by providing a heating step during which the emulsion temperature is raised, typically from 40.degree. C. to 70.degree. C., and maintained for a period of time. The precipitation and spectral and chemical sensitization methods utilized in preparing the emulsions employed in the invention can be those methods known in the art.

Chemical sensitization of the emulsion typically employs sensitizers such as: sulfur-containing compounds, e.g., allyl isothiocyanate, sodium thiosulfate and allyl thiourea, reducing agents, e.g., polyamines and stannous salts, noble metal compounds, e.g., gold, platinum, and polymeric agents, e.g., polyalkylene oxides. As described, heat treatment is employed to complete chemical sensitization. Spectral sensitization is effected with a combination of dyes, which are designed for the wavelength range of interest within the visible or infrared spectrum. It is known to add such dyes both before and after heat treatment.

After spectral sensitization, the emulsion is coated on a support. Various coating techniques include dip coating, air knife coating, curtain coating and extrusion coating.

The silver halide emulsions utilized in this invention may be comprised of any halide distribution. Thus, they may be comprised of silver chloride, silver bromide, silver bromochloride, silver chlorobromide, silver iodochloride, silver iodobromide, silver bromoiodochloride, silver chloroiodobromide, silver iodobromochloride, and silver iodochlorobromide emulsions. By predominantly silver chloride, it is meant that the grains of the emulsion are greater than about 50 mole percent silver chloride. Preferably, they are greater than about 90 mole percent silver chloride, and optimally greater than about 95 mole percent silver chloride.

The silver halide emulsions can contain grains of any size and morphology. Thus, the grains may take the form of cubes, octahedrons, cubo-octahedrons, or any of the other naturally occurring morphologies of cubic lattice type silver halide grains. Further, the grains may be irregular such as spherical grains or tabular or core/shell grains. Grains having a tabular or cubic morphology are preferred.

The photographic elements of the invention may utilize emulsions as described in The Theory of the Photographic Process, Fourth Edition, T. H. James, Macmillan Publishing Company, Inc., 1977, pages 151-152. Reduction sensitization has been known to improve the photographic sensitivity of silver halide emulsions. While reduction sensitized silver halide emulsions generally exhibit good photographic speed, they often suffer from undesirable fog and poor storage stability.

Reduction sensitization can be performed intentionally by adding reduction sensitizers, chemicals which reduce silver ions to form metallic silver atoms, or by providing a reducing environment such as high pH (excess hydroxide ion) and/or low pAg (excess silver ion). During precipitation of a silver halide emulsion, unintentional reduction sensitization can occur when, for example, silver nitrate or alkali solutions are added rapidly or with poor mixing to form emulsion grains. Also, precipitation of silver halide emulsions in the presence of ripeners (grain growth modifiers) such as thioethers, selenoethers, thioureas, or ammonia tends to facilitate reduction sensitization.

Examples of reduction sensitizers and environments which may be used during precipitation or spectral/chemical sensitization to reduction sensitize an emulsion include ascorbic acid derivatives, tin compounds, polyamine compounds, and thiourea dioxide-based compounds described in U.S. Pat. Nos. 2,487,850, 2,512,925, and British Patent 789,823. Specific examples of reduction sensitizers or conditions, such as dimethylamineborane, stannous chloride, hydrazine, high pH (pH 8-11) and low pAg (pAg 1-7) ripening are discussed by S. Collier in Photographic Science and Engineering, 23, 113 (1979). Examples of processes for preparing intentionally reduction sensitized silver halide emulsions are described in EP 0 348 934 A1 (Yamashita), EP 0 369 491 (Yamashita), EP 0 371 388 (Ohashi), EP 0 396 424 A1 (Takada), EP 0 404 142 A1 (Yamada), and EP 0 435 355 A1 (Makino).

The photographic elements of this invention may use emulsions doped with Group VII metals such as iridium, rhodium, osmium, and iron as described in Research Disclosure, September 1994, Item 36544, Section I, published by Kenneth Mason Publications, Ltd., Dudley Annex, 12a North Street, Emsworth, Hampshire PO10 7DQ, ENGLAND. Additionally, a general summary of the use of iridium in the sensitization of silver halide emulsions is contained in Carroll, "Iridium Sensitization: A Literature Review," Photographic Science and Engineering, Vol. 24, No. 6, 1980. A method of manufacturing a silver halide emulsion by chemically sensitizing the emulsion in the presence of an iridium salt and a photographic spectral sensitizing dye is described in U.S. Pat. No. 4,693,965. In some cases, when such dopants are incorporated, emulsions show an increased fresh fog and a lower contrast sensitometric curve when processed in the color reversal E-6 process as described in The British Journal of Photography Annual, 1982, pages 201-203.

A typical multicolor photographic element of the invention comprises the invention laminated support bearing a cyan ink or dye image-forming unit comprising at least one red-sensitive silver halide emulsion layer having associated therewith at least one cyan dye-forming coupler, a magenta image-forming unit comprising at least one green-sensitive silver halide emulsion layer having associated therewith at least one magenta dye-forming coupler, and a yellow dye image-forming unit comprising at least one blue-sensitive silver halide emulsion layer having associated therewith at least one yellow dye-forming coupler. The element may contain additional layers, such as filter layers, interlayers, overcoat layers, subbing layers, and the like. The support of the invention may also be utilized for black and white photographic print elements.

The photographic elements may also contain a transparent magnetic recording layer such as a layer containing magnetic particles on the underside of a transparent support, as in U.S. Pat. Nos. 4,279,945 and 4,302,523. The invention may be utilized with the materials disclosed in Research Disclosure, September 1997, Item 40145. The invention is particularly suitable for use with the material color paper examples of sections XVI and XVII. The couplers of section II are also particularly suitable. The Magenta I couplers of section II, particularly M-7, M-10, M-18, and M-18, set forth below are particularly desirable. In the following Table, reference will be made to (1) Research Disclosure, December 1978, Item 17643, (2) Research Disclosure, December 1989, Item 308119, and (3) Research Disclosure, September 1994, Item 36544, all published by Kenneth Mason Publications, Ltd., Dudley Annex, 12a North Street, Emsworth, Hampshire PO10 7DQ, ENGLAND. The Table and the references cited in the Table are to be read as describing particular components suitable for use in the elements of the invention. The Table and its cited references also describe suitable ways of preparing, exposing, processing and manipulating the elements, and the images contained therein.

| Reference | Section | Subject Matter |
|---|---|---|
| 1 | I, II | Grain composition, |
| 2 | I, II, IX, X, XI, XII, XIV, XV | morphology and preparation. Emulsion preparation including |
| | I, II, III, IX | hardeners, coating aids, |
| 3 | | A & B addenda, etc. |
| 1 | III, IV | Chemical sensitization and |
| 2 | III, IV | spectral sensitization/ |
| 3 | IV, V | Desensitization. |
| 1 | V | UV dyes, optical brighteners, |
| 2 | V | luminescent dyes |
| 3 | VI | |
| 1 | VI | Antifoggants and stabilizers |
| 2 | VI | |
| 3 | VII | |
| 1 | VIII | Absorbing and scattering |
| 2 | VIII, XIII, XVI | materials; Antistatic layers; |
| 3 | VIII, IX | C & D matting agents |
| 1 | VII | Image-couplers and image- |
| 2 | VII | modifying couplers; Dye |
| 3 | X | stabilizers and hue modifiers |
| 1 | XVII | Supports |
| 2 | XVII | |
| 3 | XV | |
| 3 | XI | Specific layer arrangements |
| 3 | XII, XIII | Negative working emulsions; Direct positive emulsions |
| 2 | XVIII | Exposure |
| 3 | XVI | |
| | I XIX, XX | Chemical processing; |
| 2 | XIX, XX, XXII | Developing agents |
| 3 | XVIII, XIX, XX | |
| 3 | XIV | Scanning and digital processing procedures |

The photographic elements can be exposed with various forms of energy which encompass the ultraviolet, visible, and infrared regions of the electromagnetic spectrum as well as with electron beam, beta radiation, gamma radiation, x-ray, alpha particle, neutron radiation, and other forms of corpuscular and wave-like radiant energy in either noncoherent (random phase) forms or coherent (in phase) forms, as produced by lasers. When the photographic elements are intended to be exposed by x-rays, they can include features found in conventional radiographic elements.

The photographic elements are preferably exposed to actinic radiation, typically in the visible region of the spectrum, to form a latent image, and then processed to form a visible image, preferably by other than heat treatment. Processing is preferably carried out in the known RA-4.TM. (Eastman Kodak Company) Process or other processing systems suitable for developing high chloride emulsions. This invention is also directed towards a photographic recording element comprising a support and at least one light sensitive silver halide emulsion layer comprising silver halide grains as described above.

Although the recording elements disclosed herein have been referred to primarily as being useful for inkjet printers, they also can be used as recording media for pen plotter assemblies. Pen plotters operate by writing directly on the surface of a recording medium using a pen consisting of a bundle of capillary tubes in contact with an ink reservoir.

EXAMPLES

TABLE 2
Structures of Dispersants

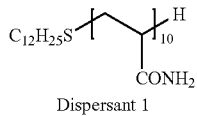
Dispersant 1

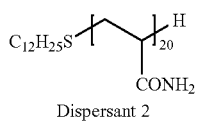
Dispersant 2

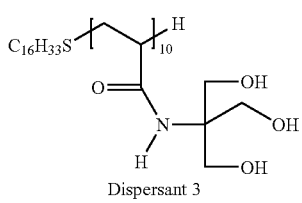
Dispersant 3

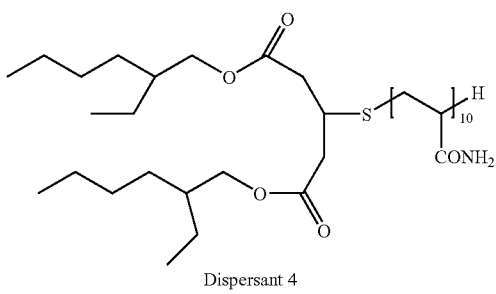
Dispersant 4

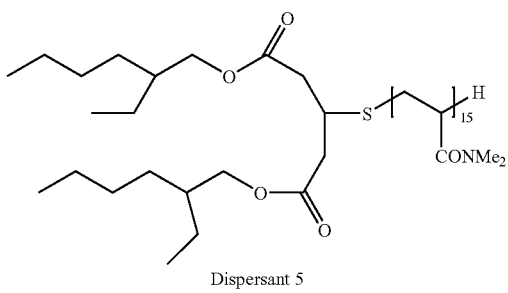
Dispersant 5

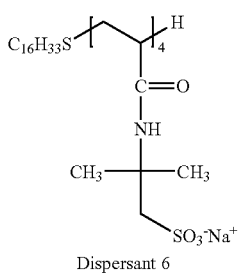
Dispersant 6

Synthetic Example 1

Synthesis of Dispersant 1

Acrylamide (35.50 g, 0.50 moles) and 1-dodecanethiol (10.10 g, 0.050 moles) were suspended in ethanol (250 ml) under nitrogen atmosphere in a 1 L three necked round bottomed flask equipped with a reflux condenser. The solution was stirred and degassed with nitrogen for 20 minutes. Stirring was continued and the temperature raised to 70° C. over a period of 20 minutes during which time the reagents dissolved. 2,2'-Azo-bis(2-methylpropionitrile)[AIBN] (1.00 g, 6.10 mmoles) was added to the stirred solution at 70° C. and heating continued for 4 hours under the control of an automated reactor system. During this time a white suspension formed. After cooling, the resulting white precipitate was filtered under suction and dried in vacuo to give a white powder (39.6 g, 87%). Analysis of this product was consistent with the desired product.

Synthetic Example 2

Synthesis of Dispersant 2

Dispersant 2 was synthesized using the same procedure as Dispersant 1 except that a higher mole ratio of acrylamide to dodecanethiol (20:1) was used.

Synthetic Example 3

Synthesis of Dispersant 3

N-acryloyl tris(hydroxymethyl)aminomethane (52.5 g, 0.40 mol), hexadecyl mercaptan (5.20 g, 0.20 mol), and AIBN (0.20 g) were placed in a 3-neck flask containing methanol (100 ml). The reaction was bubble degassed with argon for 20 minutes and heated at reflux under argon for 6 hours. On cooling, a sticky, white mass had formed in the solution. The methanol was decanted and the product was redissolved in water. Freeze drying gave a white solid (40.5 g, 70%).

Synthetic Example 4

Synthesis of Dispersant 4

Mercaptosuccinic acid (15.10 g, 0.10 moles) and 2-ethyl-1-hexanol (26.30 g, 0.20 moles) were suspended in toluene (200 ml) in a 500 ml round bottomed flask. Toluene sulfonic acid hydrate (0.10 g) was added as catalyst and the flask set up for reflux with a Dean & Stark trap. The components went into solution as the mixture was warmed and the whole was refluxed under argon atmosphere for 18 hours. The reaction mixture was concentrated by evaporation under reduced pressure then redissolved in ethyl acetate (500 ml) and washed sequentially with saturated aqueous sodium hydrogen carbonate (300 ml) and water (300 ml). The organic layer was separated, dried over anhydrous magnesium sulfate, filtered and evaporated to give a pale yellow oil (31.1 g, 83%). Analysis was consistent with di-(2-ethyl-1-hexyl)mercaptosuccinate.

Acrylamide (7.13 g, 0.100 moles), di-2-ethylhexyl mercaptosuccinate (3.72 g, 0.010 moles) and 2,2'-azo-bis(2-methylpropionitrile)[AIBN] (0.12 g) were suspended in methanol (50 ml) under argon atmosphere in a three necked round bottomed flask equipped with a reflux condenser. The solution was stirred and degassed with argon for 20 minutes. Stirring was continued and the temperature raised slowly until reflux was established. A small exotherm was observed as the temperature neared reflux. Reflux was continued for 5 hours and during this time a white suspension formed. After cooling, the resulting white precipitate was filtered under suction and dried in vacuo to give a white powder (10.00 g, 93%). Analysis of this product was consistent with the desired oligomeric amide.

Synthetic Example 5

Synthesis of Dispersant 5

Di-2-ethylhexyl mercaptosuccinate (24.60 g, 0.066 moles) and N,N-dimethylacrylamide (97.65 g, 0.985 g) were dissolved in a methanol (260 ml) in a 3-neck 500 ml flask. The solution was bubble degassed with argon for 20 minutes. AIBN (0.70 g) was added and the solution was heated at 70° C. for 17 hours under argon. The methanolic solution was washed with hexane and evaporated to give a deep brown, viscous liquid which solidified upon cooling (124.56 g). A quantity of the product was redissolved in water and freeze-dried to yield a buff solid (28.4 g).

Synthetic Example 6

Synthesis of Dispersant 6

Hexadecyl mercaptan (50.50 g, 0.195 mol) and 2-acrylamido-2-methyl-1-propanesulfonic acid (161.94 g, 0.781 mol) were combined with 1 L methanol in a 3-neck round bottom flask and bubble degassed with argon for 20 minutes. The mixture was heated to 55° C., at which point homogeneity was reached, and AIBN (1.10 g) was added. The solution was refluxed for 17 hours then cooled. A small amount of white crystals had formed with an oily mass. This was filtered and the filtrate was concentrated. The resulting viscous methanolic solution was poured into 2L diethyl ether to afford a white semisolid. This was redissolved in methanol and precipitated into ether twice more and the product semisolid was dissolved in 400 ml hot water. The solution was cooled to 40° C. and neutralized to pH 8 with 10M NaOH. The brownish product solution was freeze-dried to yield 171.3 g of pure product.

Synthetic Example 7

Synthesis of Hydrophobe-capped Polyvinyl Pyrrolidinone (Control Surfactant 1)

Dodecanethiol (20.10 g, 0.099 moles), AIBN (0.20 g), and 1-vinyl-2-pyrrolidinone (111.00 g, 0.999 mol) were dissolved in isopropanol (500 ml), bubble degassed for 20 minutes with argon, and reacted at for 18 hours at reflux. The reaction solution was precipitated into diethyl ether and the product was dried under vacuum to yield 53.5 g of product. $^1$H NMR indicated approximately 90 repeating units of vinylpyrrolidinone per dodecanethiol end capping unit.

Example 1

Polymer Particle Prepared Using Latex Polymerization 100.0 g double deionized water and 0.075 g sodium persulfate were combined in a 250 ml 3-neck round bottom flask equipped with a condenser and nitrogen inlet. The solution was bubble degasses with nitrogen for ten minutes, heated to 60° C. in a thermostatted oil bath thereafter kept under a slightly positive nitrogen pressure. A similarly degassed monomer suspension consisting of 30.0 g ethyl methacrylate, 60.0 g double deionized water, 0.075 g sodium persulfate, and 0.60 g Dispersant 1 were added via solvent pump over one hour and the reaction was heated at 60° C. for approximately 16 hours. The resulting latex was passed through a cheesecloth filter to remove only a very small amount of coagulum. The particle size of the latex was measured on a Horiba LA-920 particle size analyzer and found to be 0.177 μm with a variance of 0.003.

Example 2

Polyester-containing Particles Synthesized Via Miniemulsion Polymerization—Comparison of Nonionic Dispersants/Surfactants An organic phase consisting of the following components was measured into a series of septum cap 100 ml glass jars.

Fineclad® 385 (an aliphatic unsaturated polyester resin sold by Reichold Corporation): 3.50 g 80% divinylbenzene (mixture of m, p isomers, remainder ethylstyrene): 3.50 g toluene: 7.00 g To each, an aqueous phase was added consisting of 28 ml double deionized water, 0.07 g 4,4'-azobis(cyanovaleric acid) and 0.35 g (solid weight) of one of the nonionic Dispersants/surfactants listed in Table 3. Each jar was sonicated for 10 minutes using a probe sonicator while being cooled in an ice bath, bubble degassed with nitrogen for 10 minutes, and sealed with a rubber septum and a crimped metal cap. The jars were tumbled in a thermostatted water bath at 70° C. for 16 hours.

The results of the polymerizations are shown in Table 3. The jars containing hydrophobe-capped oligoacrylamide Dispersants all yielded well dispersed, stable particle dispersions with the exception of Dispersant 3, which contained a small amount of coagulum, but was still considered acceptable. The commercially available surfactants, representing a broad range of classes and compositions, all failed to produce stable dispersions under these conditions. It should be noted that, for miniemulsion polymerizations of this type, a hydrophobic cosurfactant is a crucial component in a miniemulsion polymerization and is used in order to prevent Ostwald ripening (see Sudol, E. D. and El-Aasser, M. in *Emulsion Polymerization and Emulsion Polymers*; Lovell, P. A. and El-Aaser, M. Eds.: John Wiley and Sons Ltd.: New York, 1997; p. 699-721). A cosurfactant was not used in this comparison, and thus the success of the hydrophobe-capped oligoacrylamides is an unexpected result.

TABLE 3

Results for Dispersant/surfactant comparison of polyester-containing particles.

| Dispersant/surfactant | Dispersant/surfactant type | Example 2 Result | Example 3 Result |
|---|---|---|---|
| Triton ® X-100 | Alkylphenol ethoxylate | Agglomerated | Agglomerated |
| Triton ® X-405 | Alkylphenol ethoxylate | Agglomerated | Agglomerated |
| Triton ® X-705 | Alkylphenol ethoxylate | Agglomerated | Agglomerated |
| Tectronic ® 908 | Tetrafunctional PEO-PPO block | Agglomerated | Well dispersed but settles over 30 days. |
| Pluronic ® F38 | PEO-PPO-PEO triblock | Agglomerated | Agglomerated |
| Pluronic ® F68 | PEO-PPO-PEO triblock | Agglomerated | Agglomerated |
| Olin ® 10G | Alkylphenol-capped polyglycerol | Agglomerated | Agglomerated |

TABLE 3-continued

Results for Dispersant/surfactant comparison of polyester-containing particles.

| Dispersant/surfactant | Dispersant/surfactant type | Example 2 Result | Example 3 Result |
|---|---|---|---|
| Control Surfactant 1 | Hydrophobe-capped polyvinyl pyrrolidone | Agglomerated | Agglomerated |
| Dispersant 1 | Hydrophobe-capped oligoacrylamide | Stable dispersion | Stable dispersion |
| Dispersant 2 | Hydrophobe-capped oligoacrylamide | Stable dispersion | Stable dispersion |
| Dispersant 3 | Hydrophobe-capped oligoacrylamide | Slight coagulum | Stable dispersion |
| Dispersant 4 | Hydrophobe-capped oligoacrylamide | Stable dispersion | Slight coagulum |
| Dispersant 5 | Hydrophobe-capped oligoacrylamide | Stable dispersion | Stable dispersion |

Example 3

Poly(Divinylbenzene-co-styrene) Particles Synthesized Via Miniemulsion Polymerization—Comparison of Nonionic Dispersants/Surfactants This comparison was carried out in a similar manner to Example 2. An organic phase consisting of the following components was measured into a series of septum cap 100 ml glass jars.

Styrene: 3.50 g

80% divinylbenzene (mixture of m, p isomers, remainder ethylstyrene): 3.50 g toluene: 7.00 g Hexadecane: 0.14 g To each, an aqueous phase was added consisting of 28 ml double deionized water, 0.07 g 4,4'-azobis(cyanovaleric acid) and 0.35 g (solid weight) of one of the nonionic Dispersants/surfactants listed in Table 3. Each jar was sonicated for 10 minutes using a probe sonicator while being cooled in an ice bath, bubble degassed with nitrogen for 10 minutes, and sealed with a rubber septum and a crimped metal cap. The jars were tumbled in a thermostatted water bath at 70° C. for 16 hours.

The results of the polymerizations are shown in Table 3. The jars containing hydrophobe-capped oligoacrylamide Dispersants all yielded well dispersed, stable particle dispersions with the exception of Dispersant 4, which contained a small amount of coagulum, but was still considered acceptable. The commercially available surfactants, representing a broad range of classes and compositions, all failed to produce stable dispersions under these conditions. Tectronic® 908 was the one exception. This surfactant yielded well-dispersed particles which settled over thirty days. In contrast, the particles stabilized by hydrophobe-capped oligoacrylamides showed no settling over this time period.

Example 4

(Invention) Porous Polymeric Particles made with Dispersant 2

To a beaker were added 260 g ethylene glycol dimethacrylate as monomer, 132 g toluene as a porogen, 8 g hexadecane, and 3.9 g 2,2'-azobis(2,4-dimethylvaleronitrile), Vazo 52® (DuPont Corp.). The ingredients were stirred until all the solids were dissolved.

To this solution was added a mixture of 15 g Dispersant 2 in 1200 g distilled water. The mixture was then stirred with a marine prop type agitator for 5 minutes to form a crude emulsion. The crude emulsion was passed once through a Crepaco homogenizer at 420 kg/cm$^2$. The resulting monomer droplet dispersion was placed into a 2-liter three-necked round bottom flask. The flask was placed in a 50° C. constant temperature bath and the dispersion stirred at 130 rev./min. under positive pressure nitrogen for 16 hours to polymerize the monomer droplets into porous polymeric particles. The product was filtered through a coarse filter to remove coagulum. Next, 4 drops of MAZU® antifoam agent (BASF Corp.) were added and toluene and some water were distilled off under vacuum at 70° C. The porous polymeric particles were measured by a particle size analyzer, Horiba LA-920®, and found to be 0.48 µm in median diameter.

Example 5 (Comparative)

Attempt to Make a Porous Polymer Particle with Dispersant 3

To a beaker were added 260 g ethylene glycol dimethacrylate as monomer, 132 g toluene as a porogen, 8 g hexadecane, and 3.9 g 2,2'-azobis(2,4-dimethylvaleronitrile), Vazo 52® (DuPont Corp.). The ingredients were stirred until all the solids were dissolved.

To this solution was added a mixture of 20 g Dispersant 3 in 1200 g distilled water. The mixture was then stirred with a marine prop type agitator for 5 minutes to form a crude emulsion. The crude emulsion was passed once through a Crepaco homogenizer at 420 kg/cm$^2$. The resulting monomer droplet dispersion was placed into a 2-liter three-necked round bottom flask. The flask was placed in a 50° C. constant temperature bath and the dispersion stirred at 130 rev./min. under positive pressure nitrogen for 16 hours to polymerize. A coagulated product resulted.

This example shows that a hydrophobically capped oligomeric acrylamide dispersant with more than 3 carbons attached to the amide nitrogen, when used in a miniemulsion of an acrylic difunctional monomer provides inadequate stability. It will be noted Dispersant 3 provided acceptable results in Examples 2 and 3.

Example 6 (Comparison)

Porous Polymeric Particles made with Commercial Non-Ionic Surfactant

The same procedure as in Comparison Example 5 was followed, except 21.6 g Pluronic® F68 (from BASF Corp.), a polyethylene-co-polyproplyene block co-polymer of molecular weight about 8400, was added to the water phase instead of Dispersant 3. During polymerization, the dispersion became unstable and agglomerated.

Example 7 (Comparison)

Porous Polymeric Particles made with Commercial Non-Ionic Surfactant

The same procedure as in Comparison Example 5 was followed, except 21.6 g Pluronic® P84 (from BASF Corp.), a polyethylene-co-polyproplyene block co-polymer of molecular weight about 4200, was added to the water phase instead of Dispersant 3. During polymerization, the dispersion became unstable and agglomerated.

Example 8 (Comparison)

Porous Polymeric Particles made with Commercial Non-Ionic Surfactant

The same procedure as in Comparison Example 5 was followed, except 21.6 g Pluronic® L64 (from BASF Corp.), a polyethylene-co-polyproplyene block co-polymer of molecular weight about 2900, was added to the water phase instead of Dispersant 3. During polymerization, the dispersion became unstable and agglomerated.

Example 9 (Comparison)

Porous Polymeric Particles made with Commercial Non-Ionic Surfactant

The same procedure as in Comparison Example 5 was followed, except 28.6 g 70% active Glycoside APG 225® (from Henkel Corp.), a sugar containing surfactant, was added to the water phase instead of Dispersant 3. During polymerization, the dispersion became unstable and agglomerated.

Example 10 (Invention)

Preparation of a Porous Polymer Particle with Dispersant 2 and a Commercial Anionic Surfactant To a beaker were added 140 g ethylene glycol dimethacrylate and 60 g methyl methacrylate as monomers, 188 g propyl acetate as a porogen, 12 g hexadecane, and 3.0 g 2,2'-azobis (2,4-dimethylvaleronitrile), Vazo 52® (DuPont Corp.). The ingredients were stirred until all the solids were dissolved.

To this solution was added a mixture of 20 g Dispersant 2 and 1.2 g sodium dodecylbenzenesulfonate in 1200 g distilled water. The mixture was then stirred with a marine prop type agitator for 5 minutes to form a crude emulsion. The crude emulsion was passed once through a Crepaco homogenizer at 420 kg/cm$^2$. The resulting monomer droplet dispersion was placed into a 2-liter three-necked round bottom flask. The flask was placed in a 50° C. constant temperature bath and the dispersion stirred at 130 rev./min. under positive pressure nitrogen for 16 hours to polymerize the monomer droplets into porous polymeric particles. Three drops of MAZU® antifoam agent (BASF Corp.) were added and propyl acetate and some water were distilled off under vacuum at 60° C. The porous polymeric particles were measured by a particle size analyzer, Horiba LA-920®, and found to be 0.17 μm in median diameter. A dried portion of the dispersion, analyzed by B.E.T. Multipoint using a Quantachrome Corp. NOVA 1000® analyzer had a specific surface area of 98 m$^2$/g.

Example 11 (Invention)

Preparation of a Porous Polymer Particle with a Two Dispersant/Surfactant System Consisting of Dispersant 2 and a Commercial Cationic Surfactant To a beaker were added 140 g ethylene glycol dimethacrylate and 60 g methyl methacrylate as monomers, 188 g propyl acetate as a porogen, 12 g hexadecane, and 3.0 g 2,2'-azobis (2,4-dimethylvaleronitrile), Vazo 52® (DuPont Corp.). The ingredients were stirred until all the solids were dissolved.

To this solution was added a mixture of 20 g Dispersant 2 and 2.4 g N-Alkyl(C12-C16)-N,N-dimethyl-N-benzyl ammonium chloride (Barquat MB-50®, from Lonza Inc.) in 1200 g distilled water. The mixture was then stirred with a marine prop type agitator for 5 minutes to form a crude emulsion. The crude emulsion was passed once through a Crepaco homogenizer at 420 kg/cm$^2$. The resulting monomer droplet dispersion was placed into a 2-liter three-necked round bottom flask. The flask was placed in a 50° C. constant temperature bath and the dispersion stirred at 130 rev./min. under positive pressure nitrogen for 16 hours to polymerize the monomer droplets into porous polymeric particles. Three drops of MAZU® antifoam agent (BASF Corp.) were added and propyl acetate and some water were distilled off under vacuum at 60° C. The porous polymeric particles were measured by a particle size analyzer. Horiba LA-920®, and found to be 0.19 μm in median diameter. A dried portion of the dispersion, analyzed by B.E.T. Multipoint using a Quantachrome Corp. NOVA 1000® analyzer had a specific surface area of 100 m$^2$/g.

Example 12 (Invention)

Preparation of a Porous Polymer Particle Containing Cationic Groups

To a beaker were added 292.5 g ethylene glycol dimethacrylate and 32.5 g chloromethylstyrene as monomers, 165 g toluene as a porogen, 10 g hexadecane, and 4.9 g 2,2'-azobis(2,4-dimethylvaleronitrile), Vazo 52® (DuPont Corp.). The ingredients were stirred until all the solids were dissolved.

To this solution was added a mixture of 30 g Dispersant 2 in 1500 g distilled water. The mixture was then stirred with a marine prop type agitator for 5 minutes to form a crude emulsion. The crude emulsion was passed once through a Crepaco homogenizer at 420 kg/cm$^2$. The resulting monomer droplet dispersion was placed into a 2-liter three-necked round bottom flask. The flask was placed in a 50° C. constant temperature bath and the dispersion stirred at 130 rev./min. under positive pressure nitrogen for 16 hours to polymerize the monomer droplets into porous polymeric particles. The product was filtered through a coarse filter to remove coagulum.

200 g of the filtered dispersion was placed into a 3-necked round bottom flask equipped with a paddle stirrer and 4.8 g of 25-27% weight trimethylamine in water was added. The flask was stoppered and stirred at room temperature for 2.5 days. Next, one drop of MAZU® antifoam agent (BASF Corp.) was added and toluene and some water were distilled off under vacuum at 50° C. The dispersion was again filtered through a coarse filter. The porous polymeric particles were measured by a particle size analyzer, Horiba LA-920®, and found to be 0.37 μm in median diameter. A dried portion of the dispersion, analyzed by B.E.T. Multipoint using a Quantachrome Corp. NOVA 1000® analyzer had a specific surface area of 93 m$^2$/g.

Example 13 (Invention)

Porous Polymeric Particles made with Dispersant 6

To a beaker were added 70 g ethylene glycol dimethacrylate and 30 g methyl methacrylate as monomers, 94 g toluene as a porogen, 6 g hexadecane, and 1.5 g 2,2'-azobis(2,4-dimethylvaleronitrile), Vazo 52® (DuPont Corp.). The ingredients were stirred until all the solids were dissolved.

To this solution was added a mixture of 10 g Dispersant 6 in 1200 g distilled water. The mixture was then stirred with a marine prop type agitator for 5 minutes to form a crude emulsion. The crude emulsion was passed once through a Crepaco homogenizer at 420 kg/cm². The resulting monomer droplet dispersion was placed into a 2-liter three-necked round bottom flask. The flask was placed in a 50° C. constant temperature bath and the dispersion stirred at 130 rev./min. under positive pressure nitrogen for 16 hours to polymerize the monomer droplets into porous polymeric particles. The product was filtered through a coarse filter to remove coagulum. Next, 4 drops of MAZU® antifoam agent (BASF Corp.) were added and toluene and some water were distilled off under vacuum at 70° C. The porous polymeric particles were measured by a particle size analyzer, Horiba LA-920®, and found to be 0.43 μm in median diameter.

The invention has been described in detail with particular reference to certain preferred embodiments thereof, but it will be understood that variations and modifications can be effected within the spirit and scope of the invention.

The invention claimed is:

1. A heterogeneous method for forming polymer particles comprising providing a water immiscible organic phase, comprising at least one monomer and a porogen, dispersed in a continuous water phase, polymerizing said organic phase to obtain dispersed polymers particles, and adding hydrophobically capped oligomeric acrylamide to the dispersed polymer particles to yield polymer particles stabilized with hydrophobically capped oligomeric acrylamide, wherein the polymeric particles range in median diameter from 0.01 to 10 μm and comprise either polyester or addition polymers of monomers containing α, β-ethylenic unsaturation, which addition polymers are styrenic, acrylic, or a polyester-addition polymer hybrid, wherein the polymer particles are porous and crosslinked by incorporation of a monomer or monomers which are polyfunctional with regard to free radical polymerization, wherein said polymer particles have a porosity of at least 100 m²/g.

2. The heterogeneous method of claim 1 wherein said hydrophobically capped oligomeric acrylamide dispersant has the formula (IV):

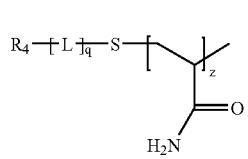

Formula IV or formula (V):

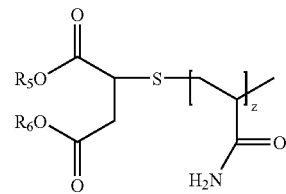

Formula V wherein:
Z is the number of repeating units, and is between 5 and 90;
$R_4$, $R_5$, and $R_6$, independently are saturated or unsaturated, branched or unbranched hydrocarbon chains containing 4 to 30 carbons atoms;
L is an optional linking group which can be —$O_2CCH_2$— or —$NHCOCH_2$—; and
q is 0 or 1.

3. The heterogeneous method of claim 2 wherein q is 1 and L is a linking group comprising —$O_2CCH_2$— or —$NHCOCH_2$—.

4. The heterogeneous method of claim 1 wherein said method is an emulsion polymerization.

5. The heterogeneous method of claim 1 wherein said method is a suspension polymerization.

6. The heterogeneous method of claim 1 wherein said method is a miniemulsion polymerization.

7. The heterogeneous method of claim 1 wherein said method is a dispersion polymerization.

8. The heterogeneous method of claim 1 wherein said method is a solvent evaporation.

9. The heterogeneous method of claim 1 wherein said polymer particles are polyester-based polymers.

10. The heterogeneous method of claim 1 wherein the polymer particles contain cationic groups selected from the group consisting of ammonium, pyridinium, and imidazolium.

11. The heterogeneous method of claim 1 wherein the polymeric particles comprise, as cationic functionality, quaternary ammonium.

* * * * *